(12) United States Patent
Radovanovic

(10) Patent No.: US 10,331,353 B2
(45) Date of Patent: Jun. 25, 2019

(54) SCALABLE DATA ACCESS SYSTEM AND METHODS OF ELIMINATING CONTROLLER BOTTLENECKS

(71) Applicant: Branislav Radovanovic, Potomac, MD (US)

(72) Inventor: Branislav Radovanovic, Potomac, MD (US)

( * ) Notice: Subject to any disclaimer, the term of this patent is extended or adjusted under 35 U.S.C. 154(b) by 27 days.

(21) Appl. No.: 15/482,726

(22) Filed: Apr. 8, 2017

(65) Prior Publication Data

US 2017/0293428 A1 Oct. 12, 2017

Related U.S. Application Data

(60) Provisional application No. 62/320,349, filed on Apr. 8, 2016.

(51) Int. Cl.
*G06F 3/06* (2006.01)
*G06F 12/0806* (2016.01)
(Continued)

(52) U.S. Cl.
CPC .............. *G06F 3/061* (2013.01); *G06F 3/065* (2013.01); *G06F 3/067* (2013.01); *G06F 3/0625* (2013.01); *G06F 12/0804* (2013.01); *G06F 12/0806* (2013.01); *G06F 12/0868* (2013.01); *G06F 2212/1016* (2013.01);
(Continued)

(58) Field of Classification Search
CPC ................................. G06F 3/061; G06F 3/067
See application file for complete search history.

(56) References Cited

U.S. PATENT DOCUMENTS 6,029,168 A 2/2000 Frey
6,427,212 B1 7/2002 Frey et al.
(Continued)

OTHER PUBLICATIONS

Notice of Allowance in U.S. Appl. No. 15/173,043 dated Jul. 26, 2017, 8 pp.
(Continued)

*Primary Examiner* — Edward J Dudek, Jr.
(74) *Attorney, Agent, or Firm* — Lathrop Gage LLP

(57) ABSTRACT

A data access system has host computers having front-end controllers nFE_SAN connected via a bus or network interconnect to back-end storage controllers nBE_SAN, and physical disk drives connected via network interconnect to the nBE_SANs to provide a distributed, high performance, policy based or dynamically reconfigurable, centrally managed, data storage acceleration system. The hardware and software architectural solutions eliminate BE_SAN controller bottlenecks and improve performance and scalability. In an embodiment, the nBE_SAN (BE_SAN) firmware recognize controller overload conditions, informs Distributed Resource Manager (DRM), and, based on the DRM provided optimal topology information, delegates part of its workload to additional controllers. The nFE_SAN firmware and additional hardware using functionally independent and redundant CPUs and memory that mitigate single points of failure and accelerates write performance. The nFE_SAN and FE_SAN controllers facilitate Converged I/O Interface by simultaneously supporting storage I/O and network traffic.

13 Claims, 18 Drawing Sheets nFE_SAN Storage Controller – Write-Back
-Cache with Mirroring

(51) Int. Cl.
*G06F 12/0804* (2016.01)
*G06F 12/0868* (2016.01)

(52) U.S. Cl.
CPC .............. *G06F 2212/1032* (2013.01); *G06F 2212/263* (2013.01); *G06F 2212/286* (2013.01); *G06F 2212/502* (2013.01); *G06F 2212/601* (2013.01); *G06F 2212/62* (2013.01)

(56) References Cited

U.S. PATENT DOCUMENTS

| | | | |
|---|---|---|---|
| 6,530,036 | B1 | 3/2003 | Frey et al. |
| 6,820,171 | B1 | 11/2004 | Weber et al. |
| 7,127,633 | B1* | 10/2006 | Olson ................ G06F 11/2092 714/4.4 |
| 7,225,317 | B1 | 5/2007 | Glade et al. |
| 7,228,391 | B2 | 6/2007 | Silvera et al. |
| 2002/0103889 | A1 | 8/2002 | Markson et al. |
| 2002/0103943 | A1 | 8/2002 | Lo et al. |
| 2003/0217310 | A1 | 11/2003 | Ebsen et al. |
| 2005/0289152 | A1 | 12/2005 | Earl et al. |
| 2006/0005076 | A1 | 1/2006 | Brown et al. |
| 2006/0029069 | A1 | 2/2006 | Frank et al. |
| 2012/0102268 | A1* | 4/2012 | Smith ................ G06F 11/2089 711/113 |
| 2013/0080408 | A1* | 3/2013 | Cashman ............. G06F 3/0608 707/692 |
| 2013/0145064 | A1* | 6/2013 | Radovanovic .......... G06F 13/38 710/113 |
| 2015/0347046 | A1* | 12/2015 | Wang ............................ 711/162 |
| 2016/0085460 | A1* | 3/2016 | Chandrashekar ..... G06F 3/0617 711/130 |
| 2017/0286220 | A1* | 10/2017 | Gerhard .............. G06F 11/1076 |

OTHER PUBLICATIONS

Science Direct, Patrick Geoffray, "OPIOM: Off Processor I/O with Myrinet", Myricom Inc., Jan. 1, 2002, pp. 1-14.
"High Bandwidth Data Transfer with OPIOM & Myrinet: Application to Remote Video," Goglin et al., Jun.-Aug. 2001.
"Guide to Myrinet—2000 Switches and Switch Networks," Myricon, Inc., Aug. 2001.
"SANique CFS a SAN-Based Cluster File System Technical Whitepaper," MacroImpact, Aug. 2002.
"VISA: Netstation's Virtual Internet SCSI Adapter," Van Meter et al., University of Southern California, 1998.
Application and File History of U.S. Appl. No. 10/673,704, Radovanovic, filed Sep. 29, 2003, 397 pages.
Selected pages from File History of U.S. Appl. No. 11/292,838, dated Feb. 6, 2008 through Nov. 30, 2012, 296 pages.
Select pages from File History of U.S. Appl. No. 13/731,854, dated May 15, 2013 through Dec. 26, 2013, 33 pages.
Select pages from File History of U.S. Appl. No. 14/252,268, dated Feb. 10, 2015 through Jul. 21, 2015, 30 pages.
Select pages from File History of U.S. Appl. No. 14/813,533, dated Sep. 8, 2015 through Feb. 3, 2016, 23 pages.

* cited by examiner

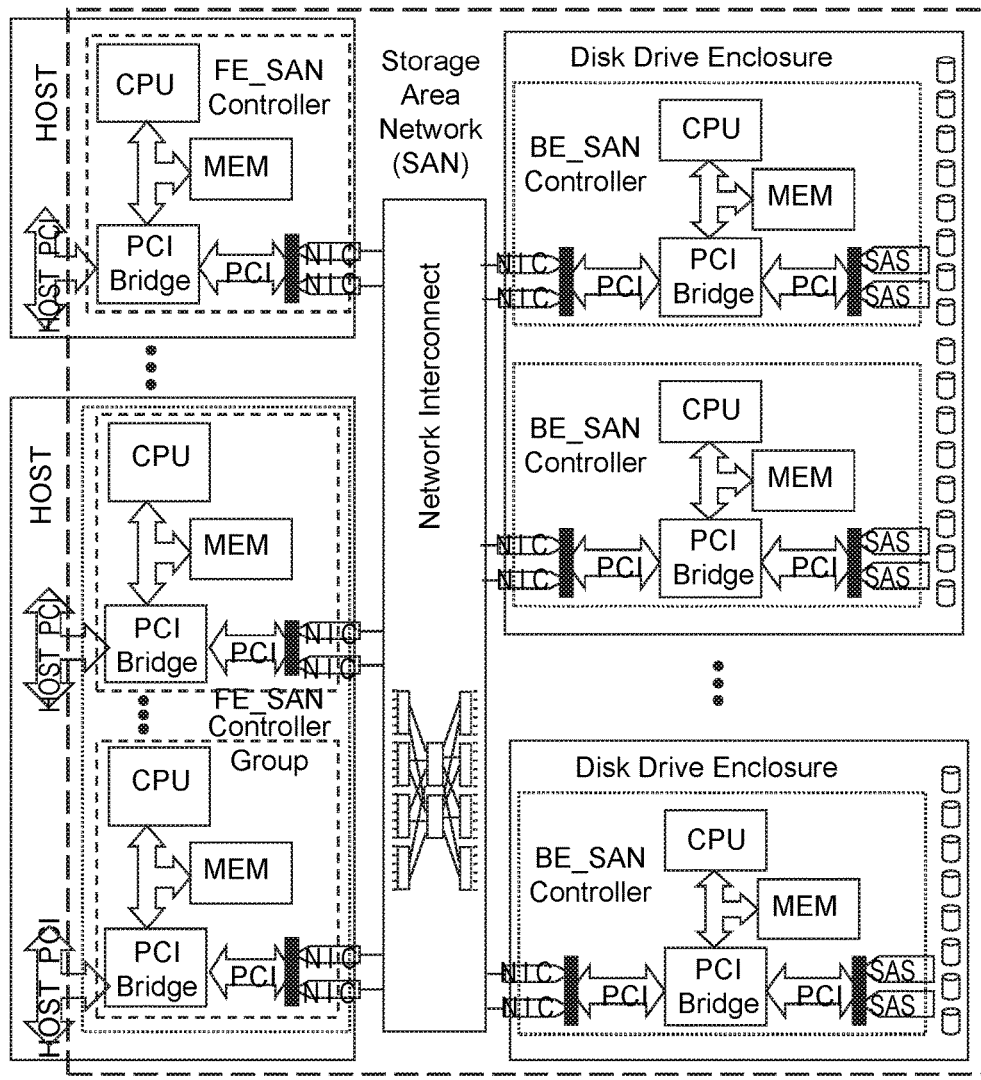
FIG. 1 Storage Area Network (SAN) with multiple controllers with distributed data access architecture (PRIOR ART)

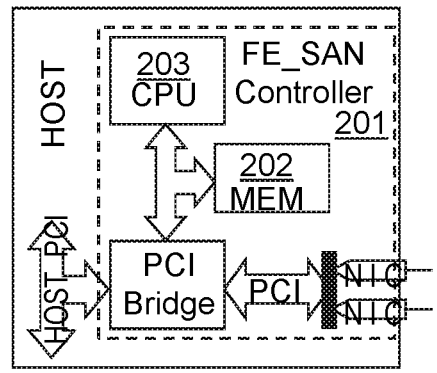
FIG. 2 FE_SAN Storage Controller (PRIOR ART)
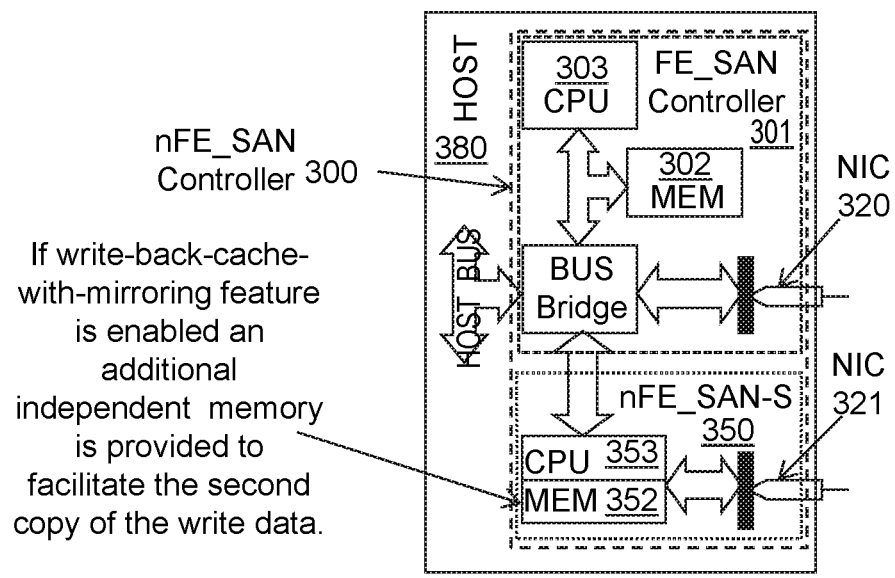
FIG. 3 nFE_SAN Storage Controller – Write-Back -Cache with Mirroring

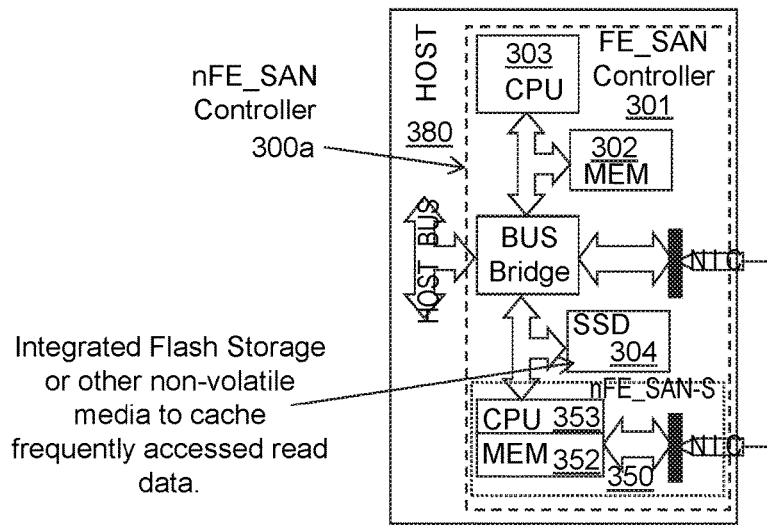
FIG. 3a nFE_SAN Storage Controller – Write-Back Cache with Mirroring
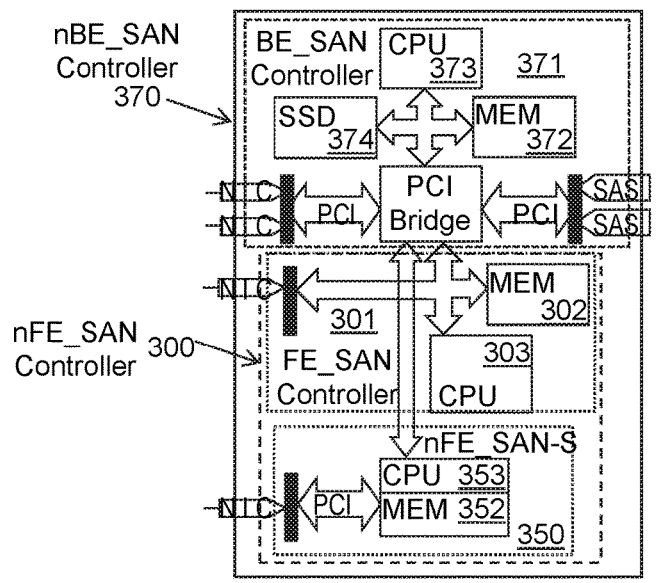
FIG. 3b nBE_SAN with integrated nFE_SAN Storage Controller

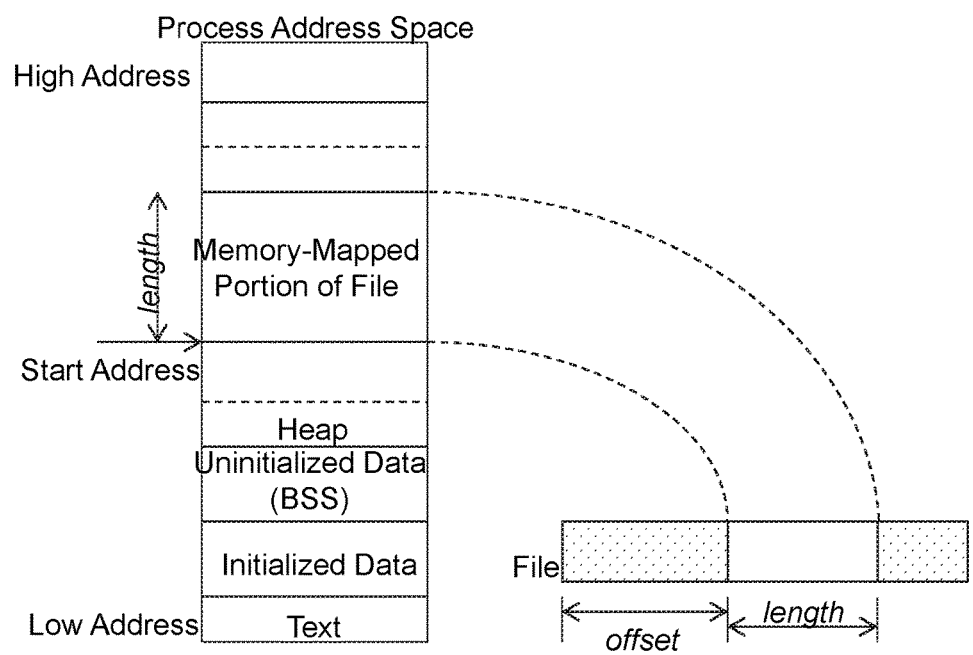
FIG. 4 Memory-Mapped File
(PRIOR ART)

510 FE_SAN Controller

511 FE_SAN Controller Group

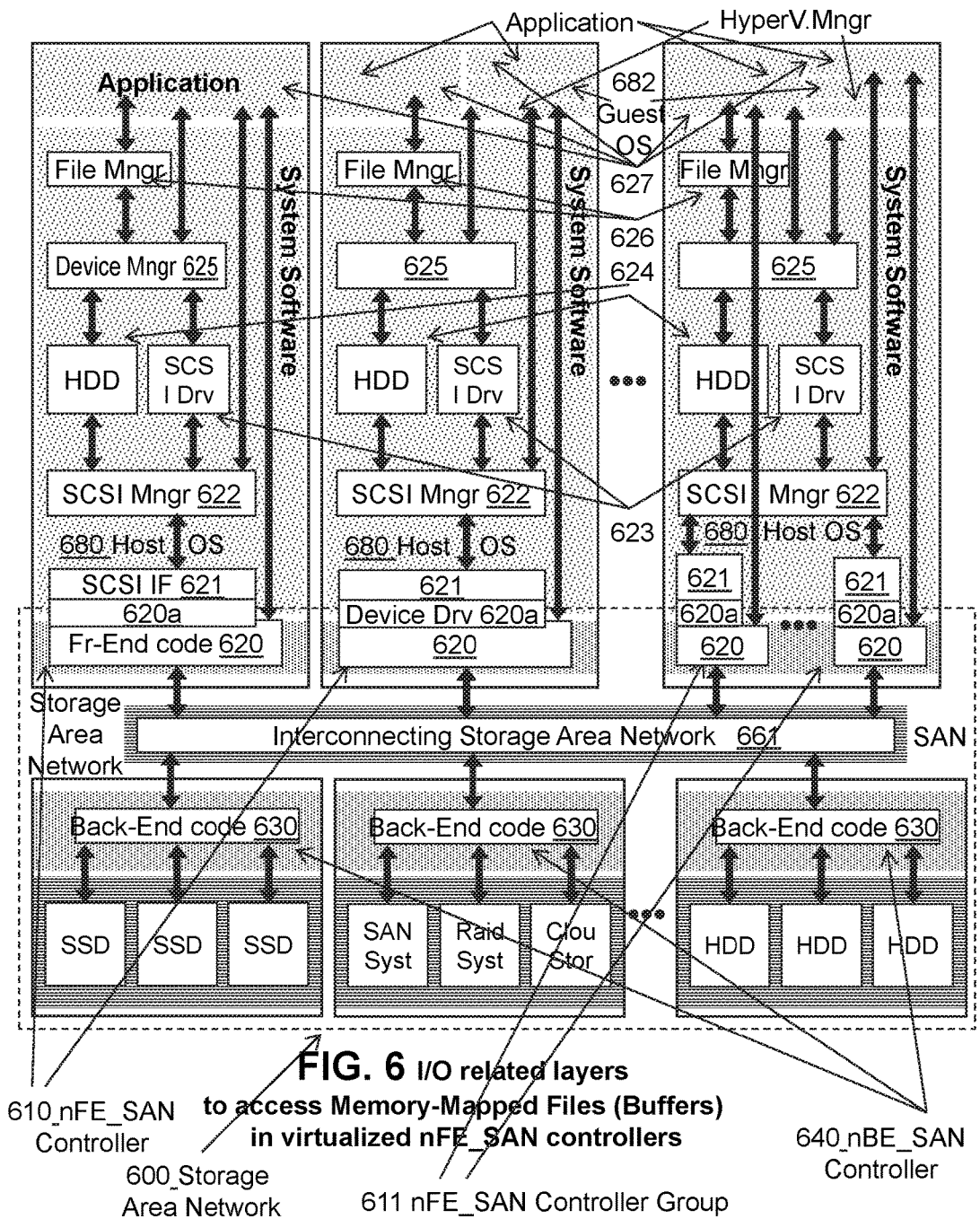
FIG. 6 I/O related layers to access Memory-Mapped Files (Buffers) in virtualized nFE_SAN controllers

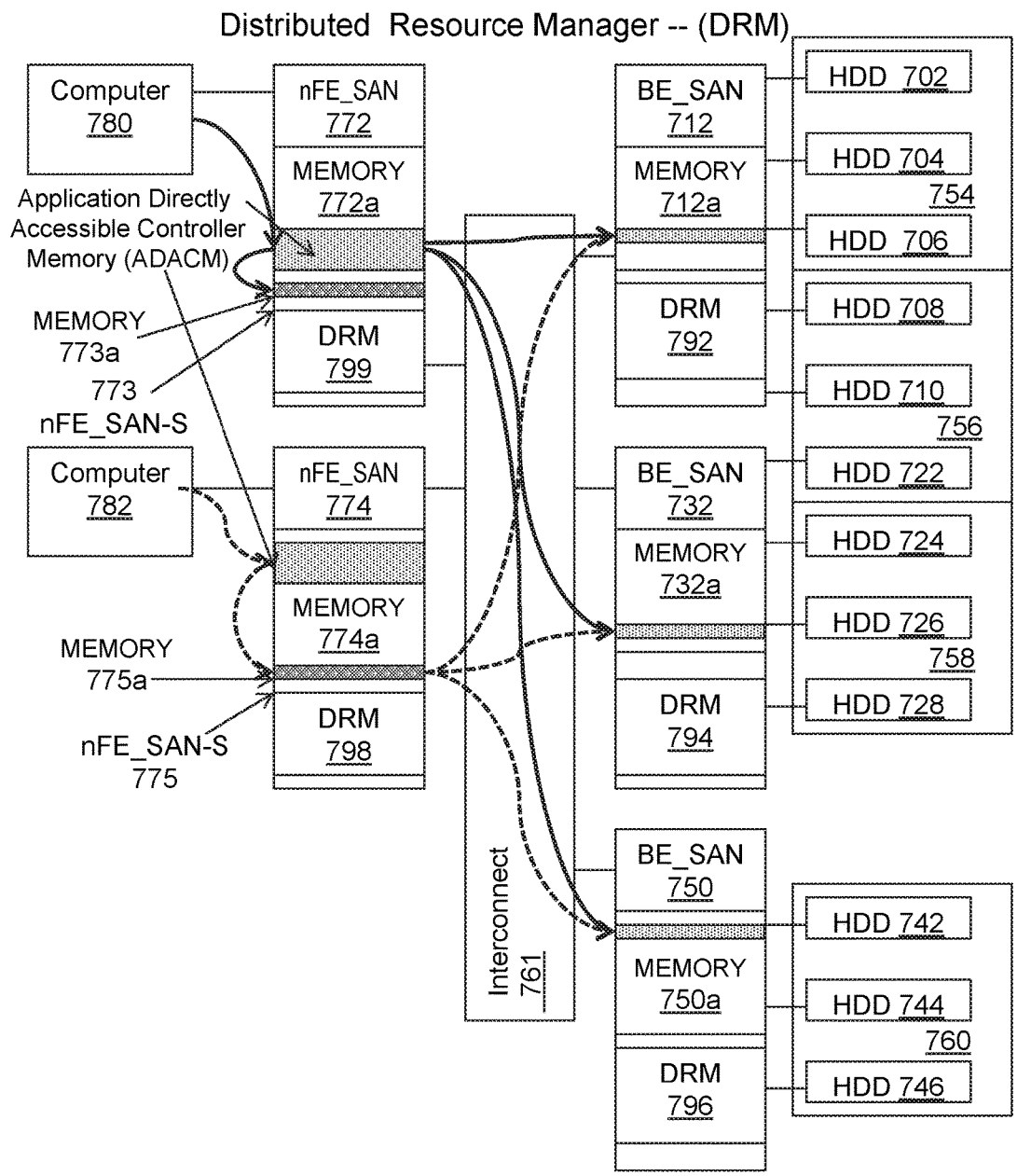
FIG. 7 Storage Area Network (SAN) with multiple controllers with host OS mapped FE_SAN controller memory

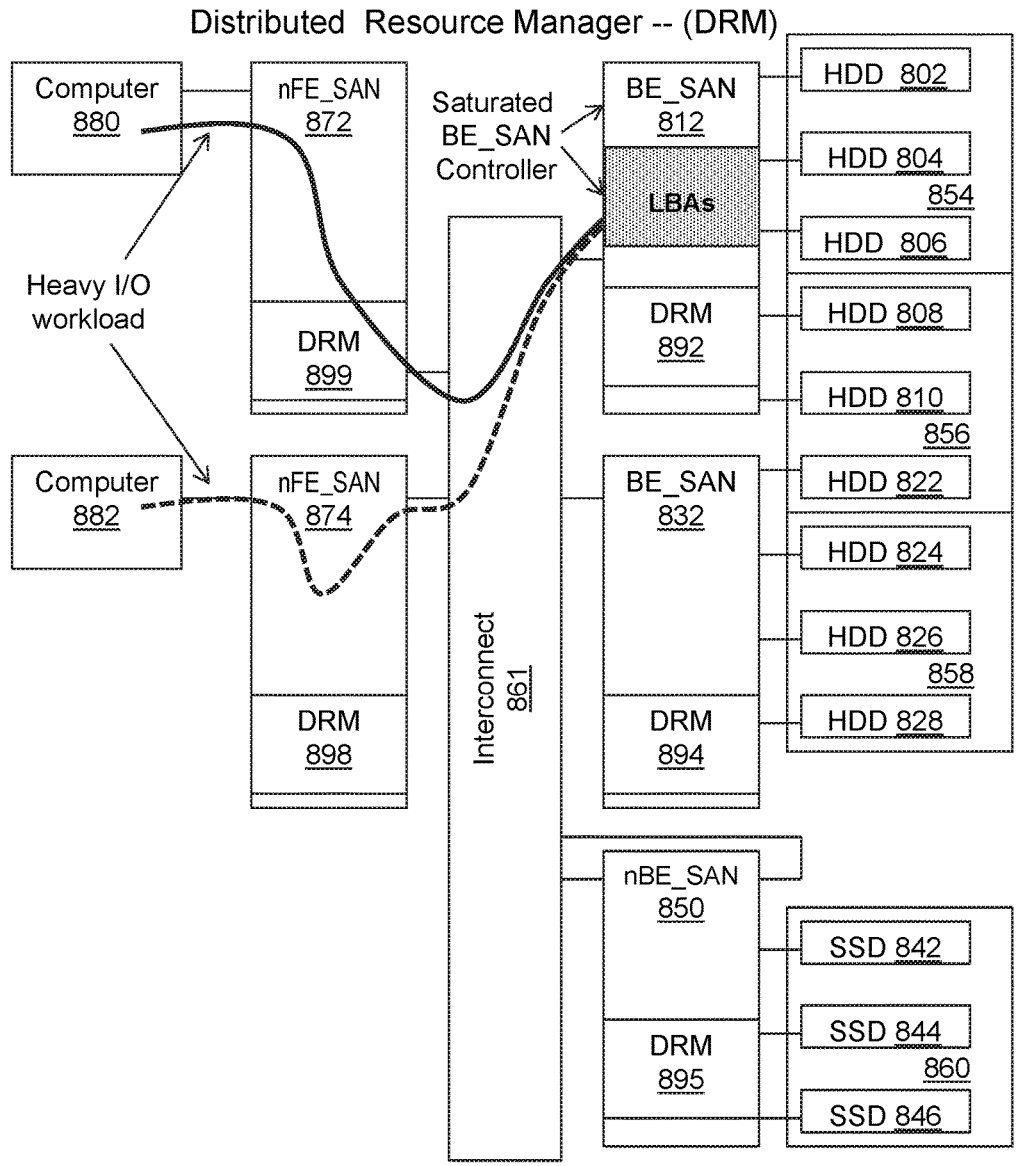
FIG. 8 Storage Area Network (SAN) with multiple controllers with host OS mapped FE_SAN controller memory

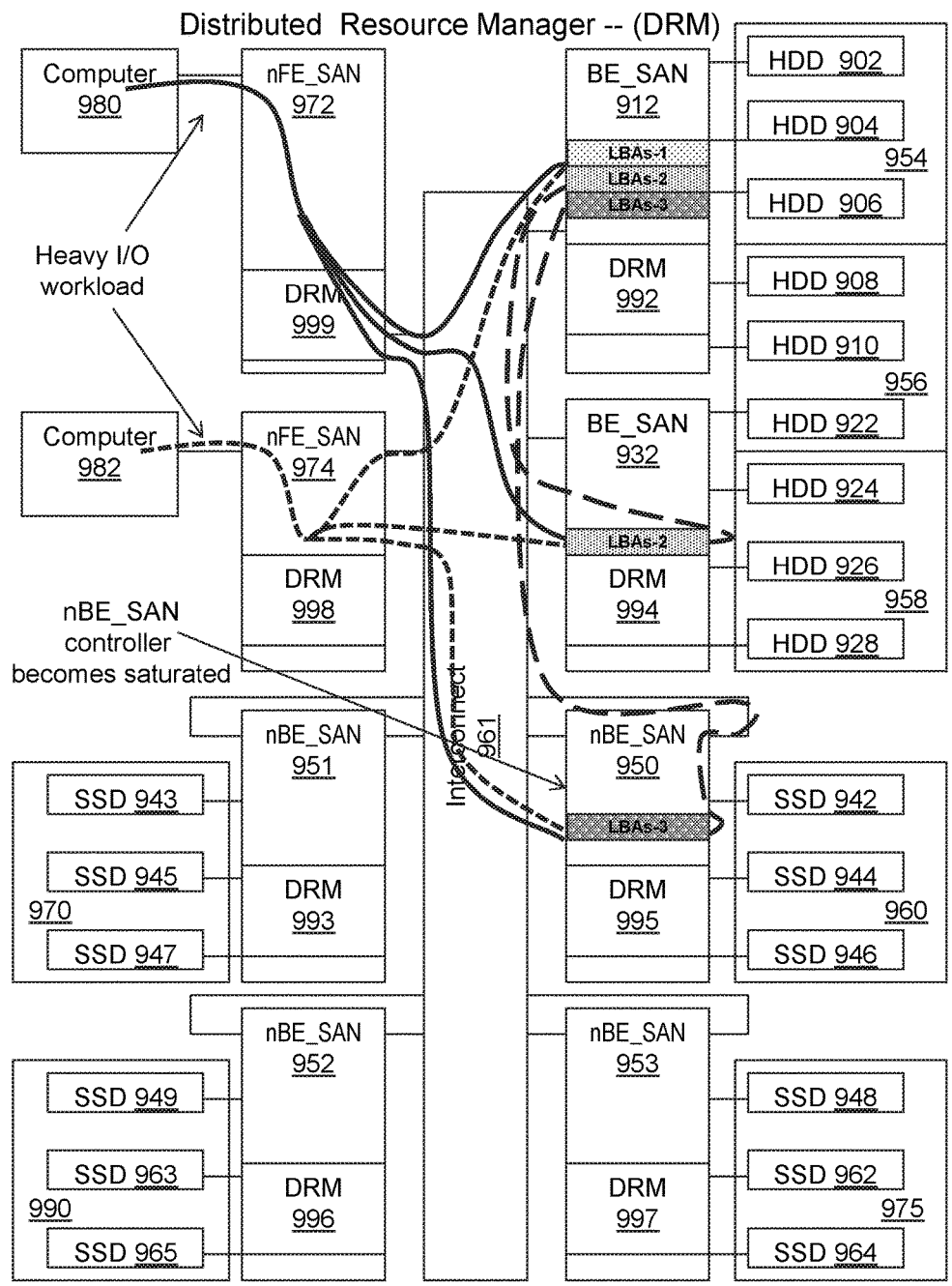
FIG. 9 Storage Area Network (SAN) with multiple spare controllers with host OS mapped FE_SAN controller memory

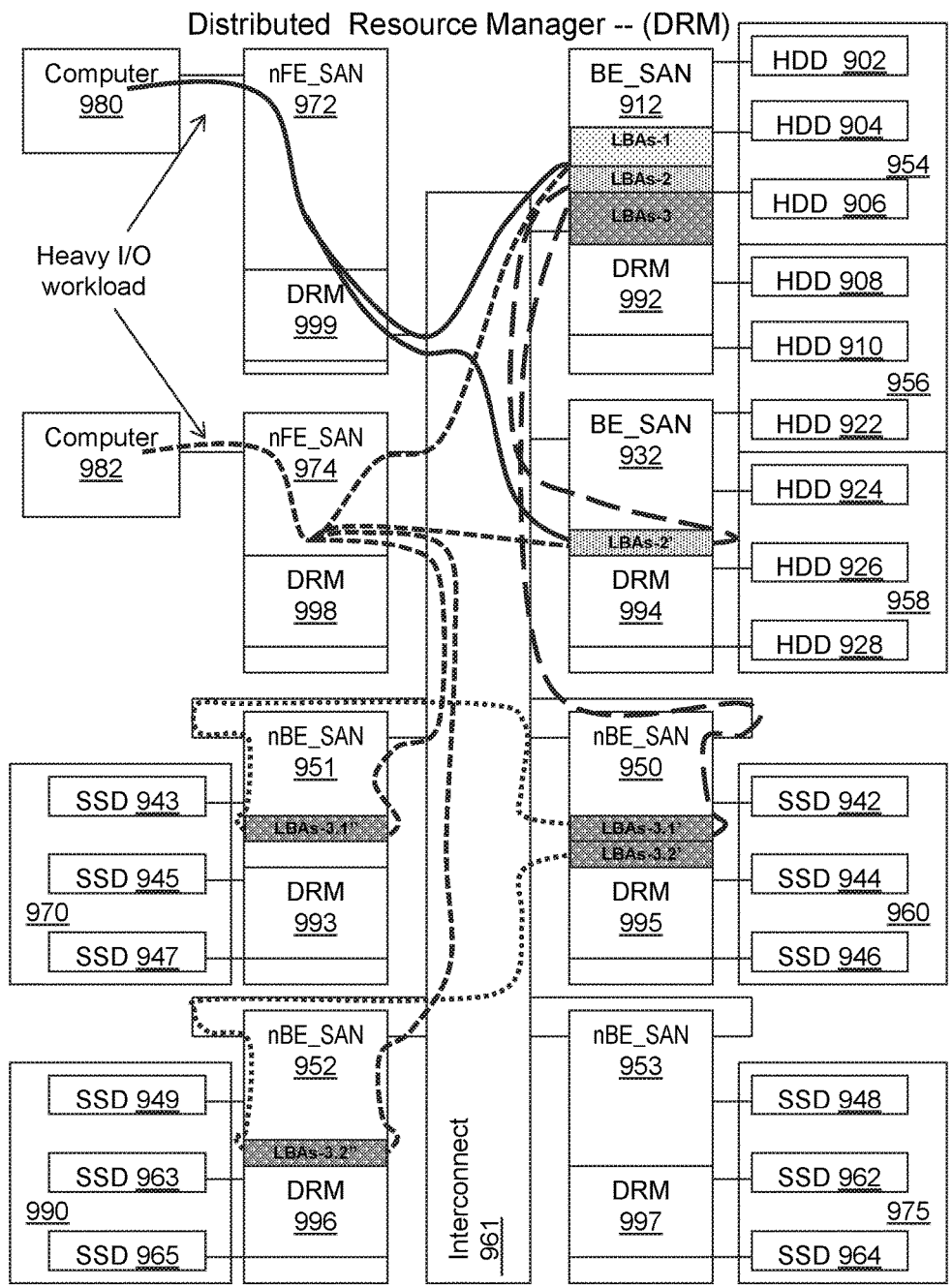
FIG. 10 Storage Area Network (SAN) with multiple spare controllers with host OS mapped FE_SAN controller memory

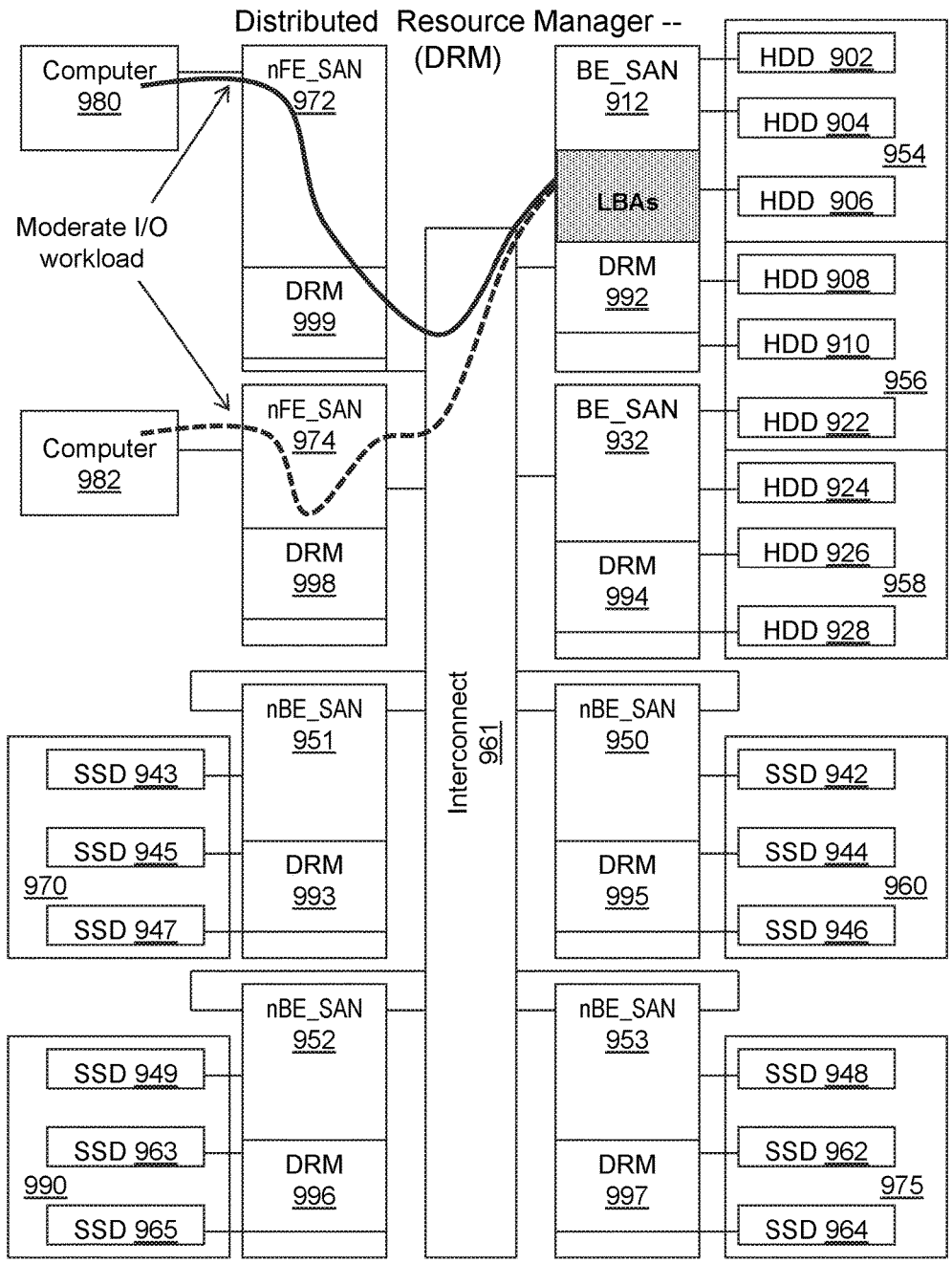
FIG. 11 Storage Area Network (SAN) with multiple controllers with host OS mapped FE_SAN controller memory

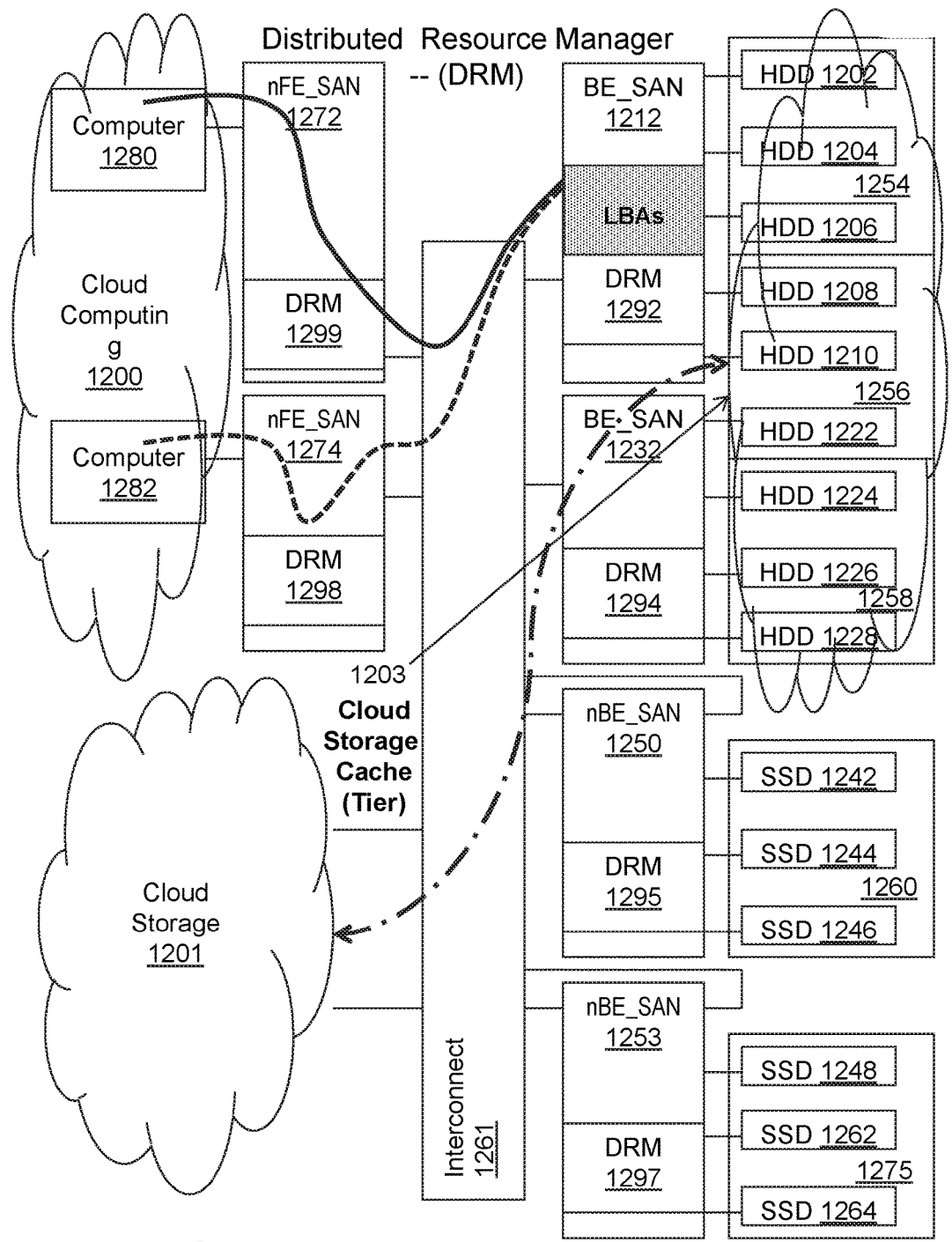
FIG. 12 Storage Area Network (SAN) with multiple controllers serving as cache (tier) for Cloud Storage

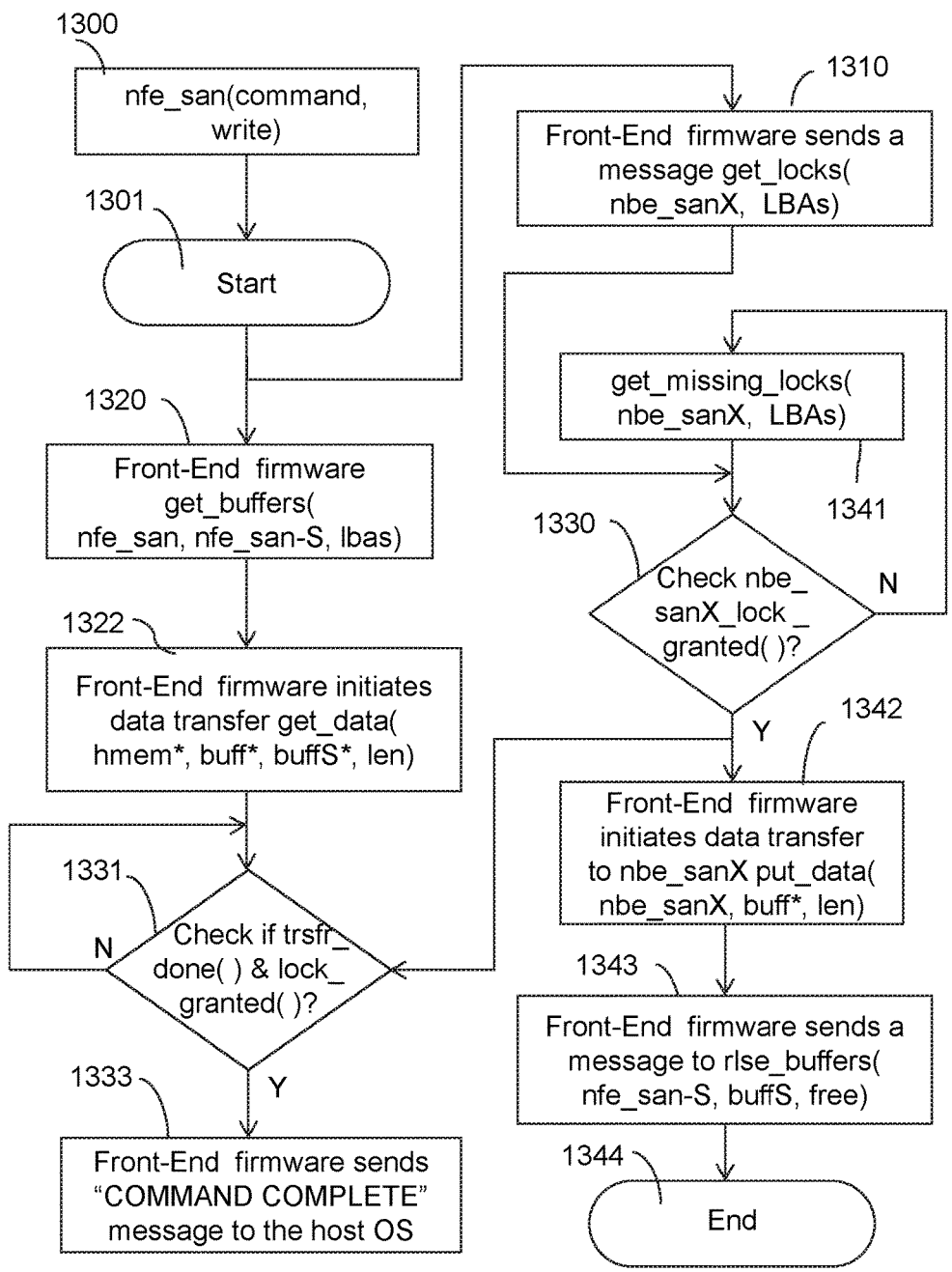
FIG. 13  nFE_SAN executes a write request write( lba, len)

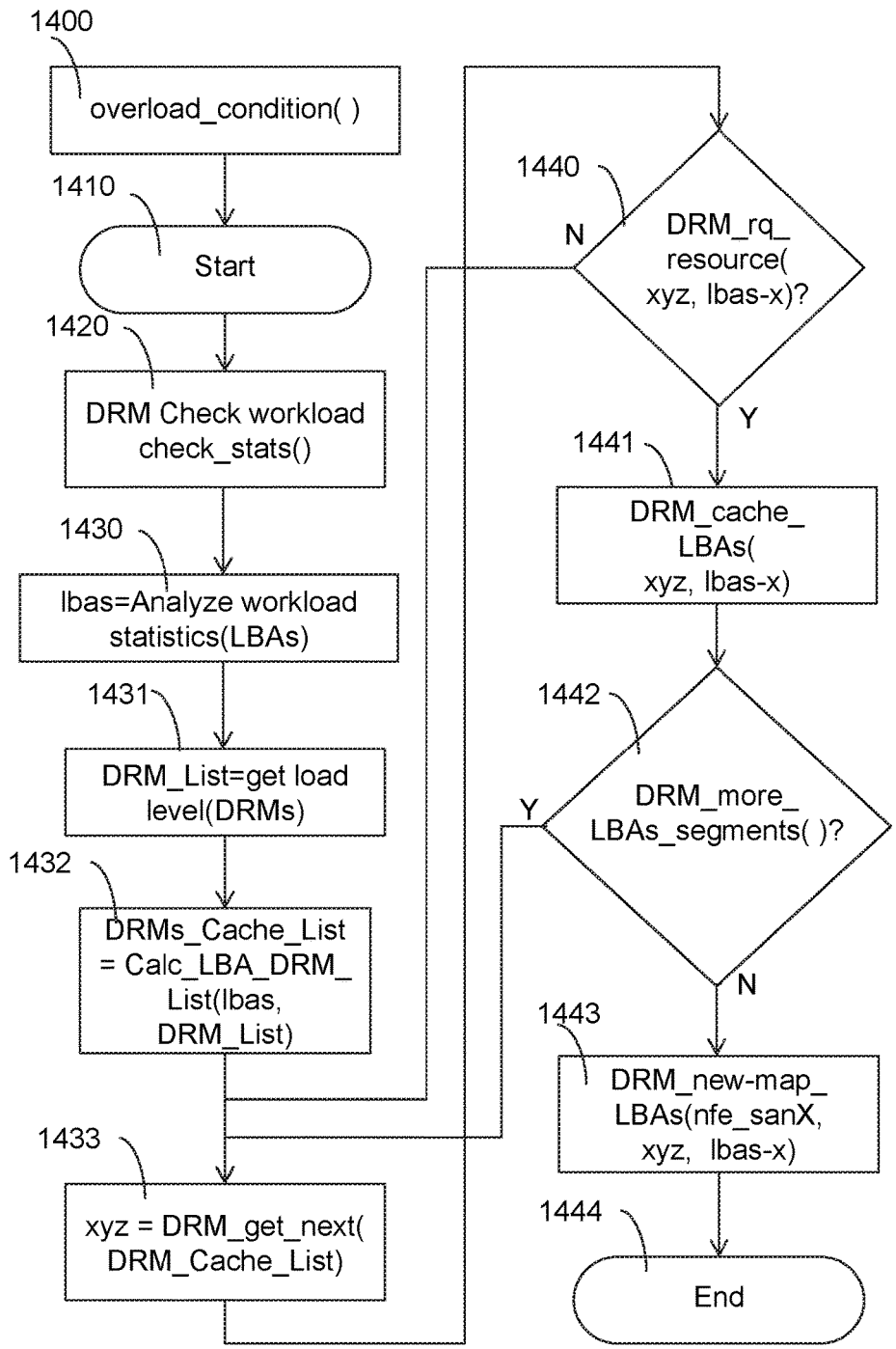
FIG. 14 On overload - DRM coordinates LBAs caching with other DRMs

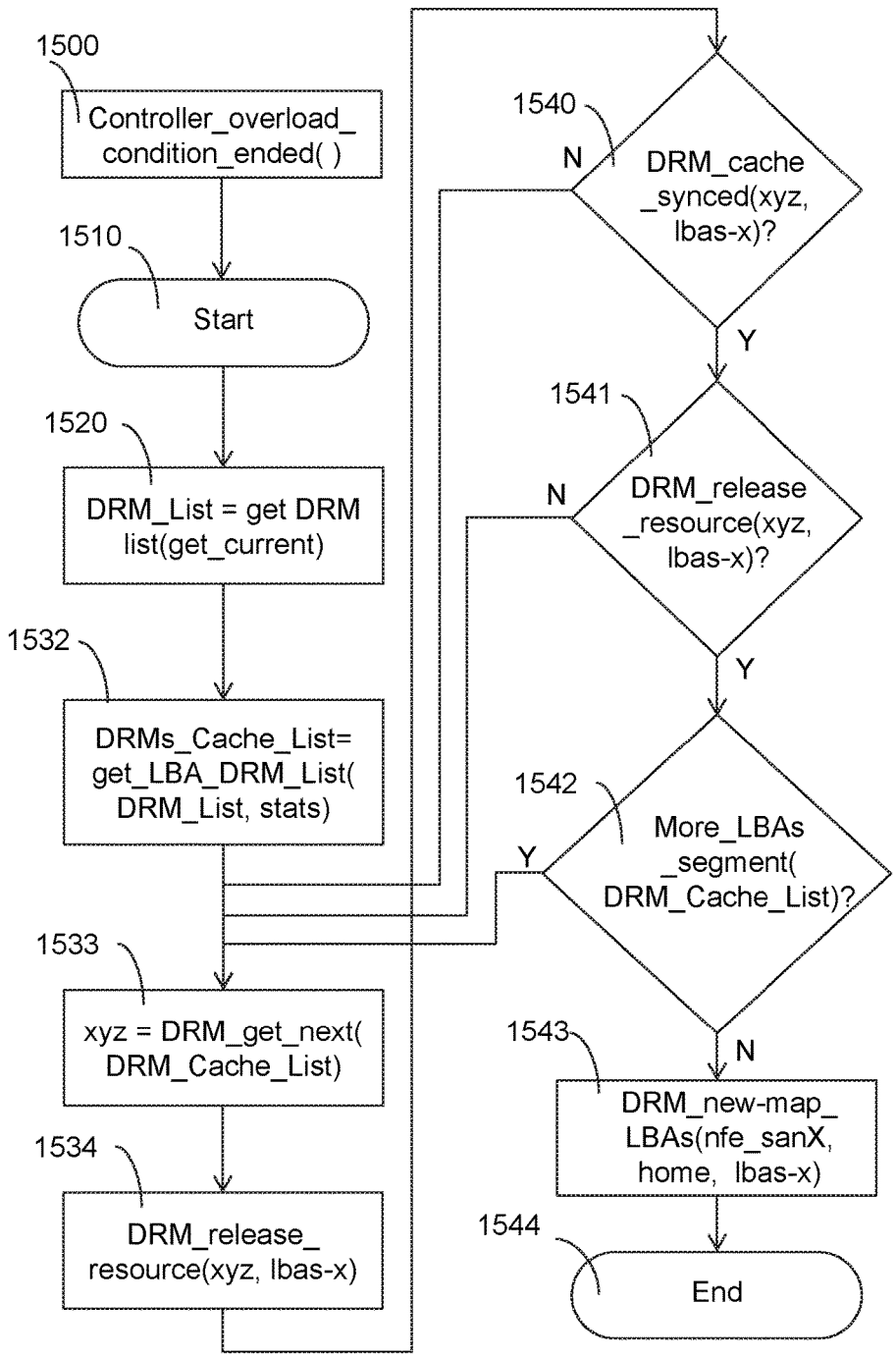
FIG. 15 On overload ended –
DRM releases LBAs caches on other nBE_SANs

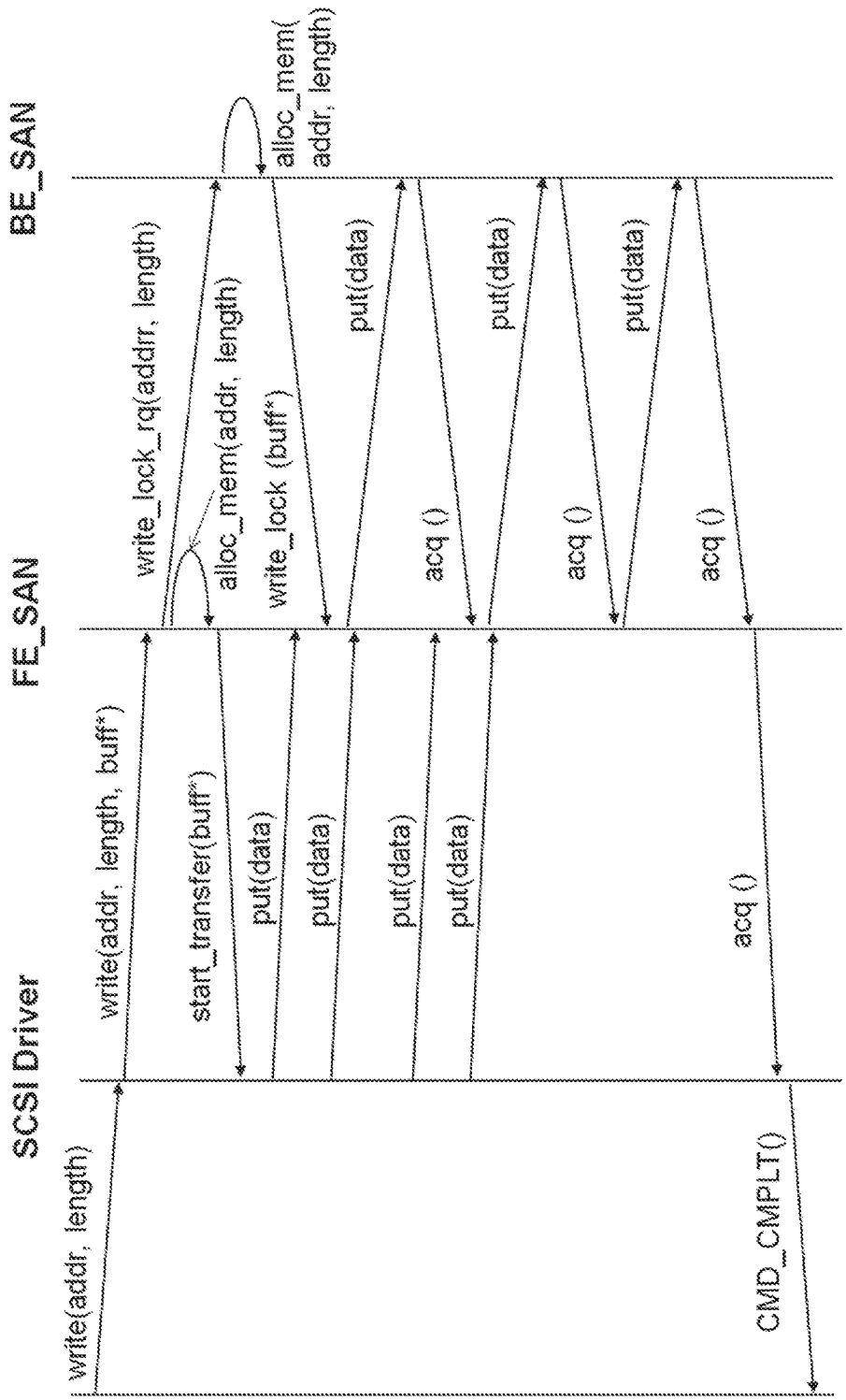
FIG. 16 Sequence Diagram – FE_SAN -> BE_SAN write (PRIOR ART)

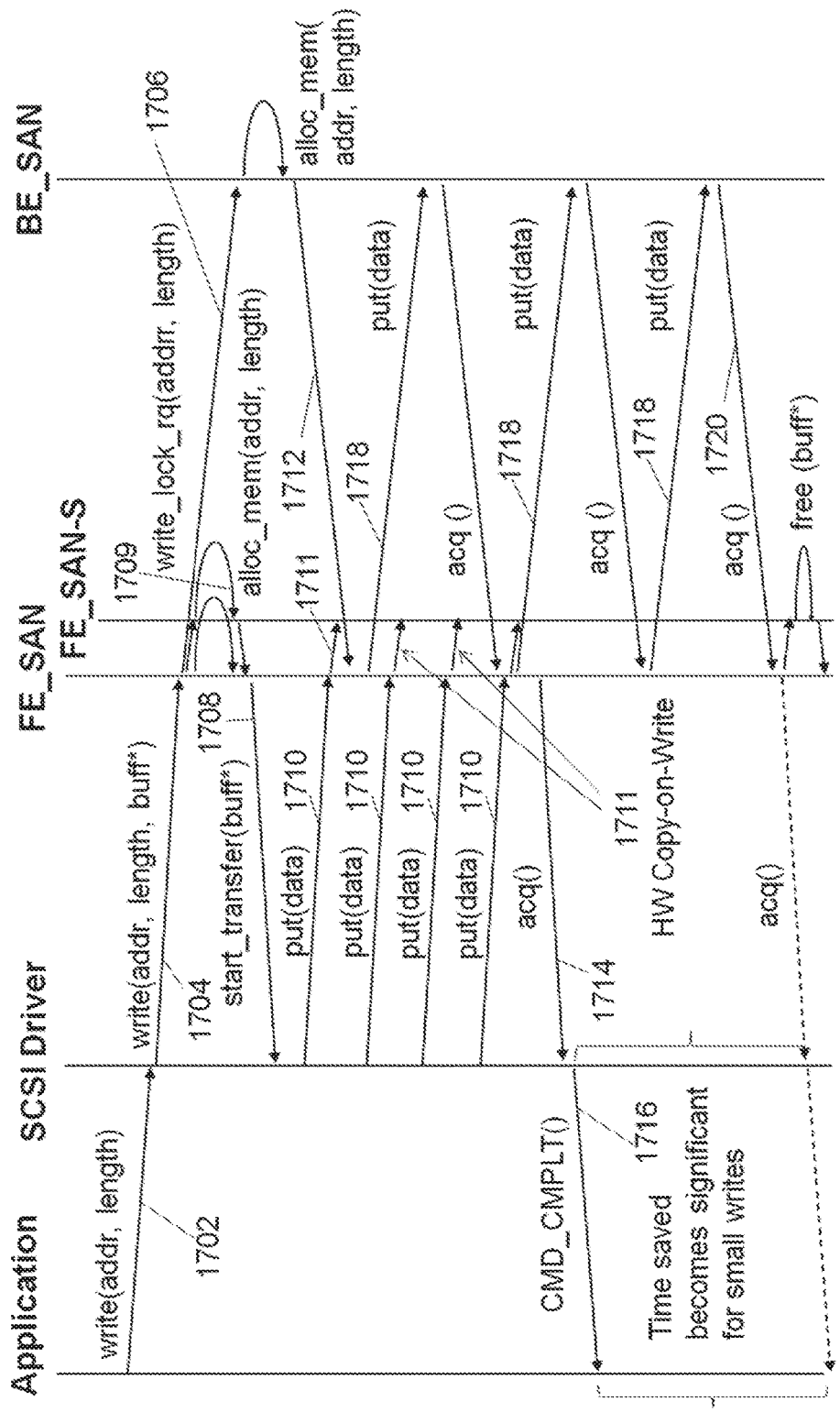
FIG. 17 Sequence Diagram – nFE_SAN -> nBE_SAN write

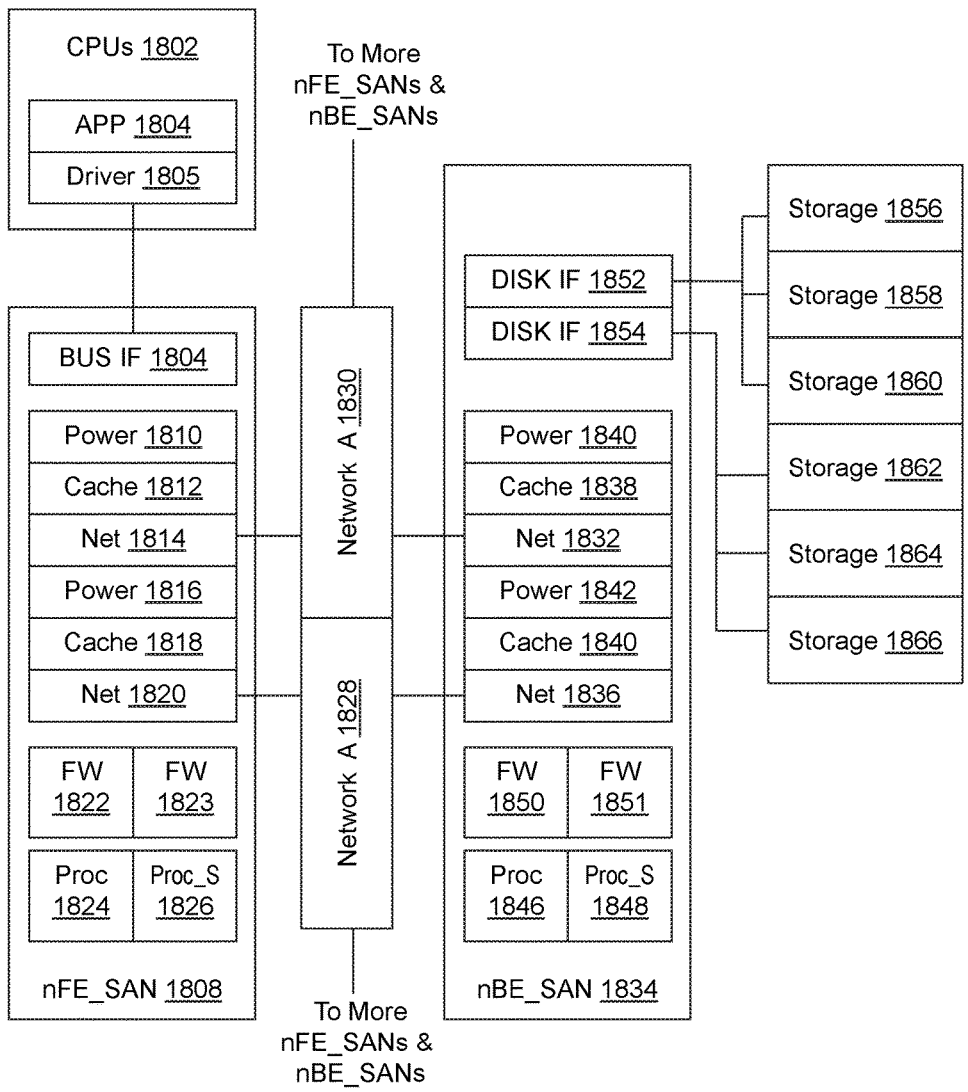
FIG. 18  Data Access System with multiple nFE_SAN and nBE_SAN controllers

SCALABLE DATA ACCESS SYSTEM AND METHODS OF ELIMINATING CONTROLLER BOTTLENECKS

RELATED APPLICATIONS

This application claims priority to U.S. provisional patent application 62/320,349 filed Apr. 8, 2016. This application is also related generally to improvements on the storage technology described in U.S. patent application Ser. No. 15/173,043, which in turn claims priority to U.S. patent application Ser. No. 11/292,838 and U.S. patent application Ser. No. 14/252,838; the contents of all the aforementioned patent applications and patents are incorporated herein by reference.

BACKGROUND OF THE INVENTION

This document generally relates to the field of storage controllers and Storage Area Network (SAN) systems. The goal for this innovative storage technology is to boost performance by accelerating data access speed while improving overall datacenter efficiency to produce immediate saving in power, cooling costs, and floor space.

According to Moore's law, CPU performance improves about 2x over two years, or approximately 50% per year. Although, historically Hard Disk Drive (HDD) capacity improves at the same rate, data access speed improvements lag behind the CPU performance and HDD capacity improvements. Based on a number of published papers and study reports, the CPU performance improves roughly 50% per year while storage I/O performance improves only about 5% per year. Thus, since 1980, the CPU performance has increased over quarter of a million times while the performance of legacy SAN systems (many of which are Redundant Array of Independent Disks (RAID) systems) has improved only about 12 times. Therefore, it is clear that in a computer system there is a growing I/O performance gap between compute and storage performance, which may limit the maximum achievable utilization of such unbalanced computer systems. Even with new advances in Flash Memory and Solid-State Drive (SSD) technology, the data access speed fails to match performance advances in CPU and memory technologies.

To further improve data storage scalability and performance to be able to meet Big Data and Exascale computational requirements for ultra-high data access speeds and capacity, a new herein-disclosed technology leverages the architecture and methods we have disclosed in our previous U.S. Pat. No. 9,118,698, the disclosure of which is incorporated herein by reference. With the world's data more than doubling every two years, there is ever-increasing demand for more storage capacity and performance. Legacy SAN and RAID technologies available today are unable to meet performance requirements and, with prohibitively high cost, are out of reach for the majority of the small and some medium size businesses.

To reduce cost, organizations often utilize large number of disjoint individual physical servers with one or more Virtual Servers (VMs) where each server may be dedicated to one or more specific applications, such as email server, accounting packages, etc. However, such approach introduces other issues such as insufficient storage I/O performance, system and network administration, fault tolerance, fragmented data storage, online storage and backup management problems, as well as system complexity, and so forth. Data access and data sharing could be done at different levels such as block level (shared block storage), multiple hosts accessing the same disk drives or Logical Unit Numbers (LUNs), or for file level access using legacy file systems like Network File System (NFS), Common Internet File System (CIFS), or modern parallel file systems such as Lustre, GPFS, QFS, StorNext, etc.

In addition, TCP/IP protocol overhead together with network latency affects the performance of NFS/CIFS storage systems by significantly increasing access delays for network-attached storage when compared to locally attached disks slowing down applications and lowering overall datacenter utilization that may result in lower employee productivity. However, locally attached disk performance is usually slower than data storage subsystem implementations such as legacy SAN and RAID subsystems. Traditional SAN design and implementation, even though in many cases superior to locally attached disks, tends to significantly underutilize aggregate data rate of all attached disk drives or SSDs by making use of time division multiplexing over, typically, small number of relatively slow I/O ports (network links) between servers and attached SAN subsystem(s).

SUMMARY

The present system is an improvement over the previously disclosed data storage architectures (Scalable Data Storage Architecture and Methods of Eliminating I/O Traffic Bottlenecks), by means of self-reconfiguring storage controllers and multi-level storage architecture. In addition, the new hardware architecture and firmware algorithms provide additional data access performance scaling, for bursty I/O traffic, without a need for additional back-end hard disk drives (HDDs) or solid state drives (SSDs). For that reason it is called a "Scalable Data Access System" rather than SAN. Thus, with this new data access system further decoupling of I/O performance from storage capacity was made possible. The new architecture still facilitates parallel execution of the Front-End code on independent FE_SAN and nFE_SAN (new FE_SAN design) controllers and employs locking mechanism in the Back-End code (executed on the BE_SAN and nBE_SAN (new BE_SAN design) controllers) to enforce data coherency and prevent data corruption.

To denote that either nFE_SAN or FE_SAN, (nFE_SAN/FE_SAN), controller(s) may be utilized the abbreviated notation will be used herein:

(*n*)FE_SAN=(*n*FE_SAN or FE_SAN).

Similarly, we denote that either nBE_SAN or BE_SAN controller(s) may be used using notation:

(n)BE_SAN=(nBE_SAN/BE_SAN)

Furthermore, to accelerate execution of write requests and to improve reliability and resiliency, the new nFE_SAN controller hardware design enables a second copy of write data to be maintained locally without a need to first traverse the network fabric and store the second copy of the data on (n)BE_SAN controller(s). In order to prevent single-points-of-failure, the nFE_SAN controller design includes two independent write-back cache memory buffers, each with corresponding processing, network-interface, and power components. Thus, a single nFE_SAN controller card has two operationally independent controllers, FE_SAN controller and redundant nFE_SAN-S sub-controllers. In order to free up memory buffers with one copy of the data, de-staging of the nFE_SAN controller cache to (n)BE_SAN controller(s) is done as soon as possible and upon its completion the duplicate memory buffer (with one copy of the data) may be released, while the nFE_SAN may optionally retain a single copy in the cache to permit ultrafast data access. Even though, an nFE_SAN controller card has two different subsections, FE_SAN controller and nFE_SAN-S sub-controller, they may be presented to the host operating system (OS) as a single nFE_SAN controller while the underlying complexity is hidden away from the host OS and user.

BRIEF DESCRIPTION OF THE DRAWINGS

The foregoing and other objects, features and advantages of the invention will be apparent from the following more comprehensive description of embodiments of the system, as illustrated in the accompanying drawings in which like reference characters refer to similar parts throughout the different views.

FIGS. 1 and 2 (PRIOR ART) depict the a storage system as shown in U.S. Pat. No. 9,118,698 entitled Scalable Data Storage Architecture and Methods of Eliminating I/O Traffic Bottlenecks.

FIG. 3 illustrates nFE_SAN 300 controller design example which accelerates execution of write requests by utilizing write-back-caching-with-mirroring enabled hardware and method.

FIG. 3a depicts nFE_SAN 300a controller design example with integrated flash storage (SSD) 304 or other non-volatile media to cache frequently accessed read/write data. As non-volatile media becomes more affordable, it creates an opportunity to leverage additional non-volatile storage capacity 304 to reduce network traffic by writing data to 304 and keeping frequently read data locally.

FIG. 3b shows nBE_SAN 370 controller of an embodiment with an integrated nFE_SAN 300 controller.

FIG. 4 (PRIOR ART) illustrates a memory-mapped file method, commonly used in UNIX/Linux environments. With this method, a file or a portion of a file is mapped onto application address space for directly accessing file data bypassing OS stack and SCSI layers while minimizing overhead associated with file data access.

FIG. 6 depicts an application running on host or guest OSs can communicate directly with the Front-End, (n)FE_SAN, controller firmware 620 via provided Application Programming Interface (API) and Application Binary Interface (ABI). This technique eliminates overhead of host OS 680, hypervisor or virtualization layers, and SCSI stack 621, 622, 623, and 625 and accelerates data access by mapping portion the controller's memory containing file data into application 627 address space to directly access the data placed in the nFE_SAN 610 or nFE_SAN 611 controller. Similar technique could be used, if file system is not present, to directly map LBAs in the host OS 680 or guest OSs 682.

FIG. 7 explains how Front-End firmware for a memory-mapped file on the nFE_SAN 772 controller allocates memory buffers 772a and 773a locally and further allocates corresponding memory (712a, 732a, and 750a) on the (n)BE_SAN 712, 732, and 750 controllers for files distributed over a number of (n)BE_SAN controllers.

FIG. 8 illustrates a scenario where multiple computers (hosts) 880 and 882 generate very heavy I/O workload that saturates BE_SAN 812 controller by repeatedly accessing certain range of Logical Block Addresses (LBAs). The depicted embodiment includes nFE_SAN 872 and 874 controllers, BE_SAN 812 and 832, and nBE_SAN 850 controllers. As illustrated in FIG. 3b nBE_SAN 850 controller has integrated nFE_SAN 300 controller while BE_SAN 812 and 832 controllers use legacy BE_SAN controller hardware with new firmware that supports DRM 892 and 894 feature and functionality. nBE_SAN 850 controller also contains DRM 895 module.

FIG. 9 depicts a case where Distributed Resource Manager (DRM) 992 detects excessive workload which causes BE_SAN controller 912 overload condition. In order to alleviate the BE_SAN controller 912 overload condition, DRM redistributes (rebalances) the workload across BE_SAN 912 and 932 and nBE_SAN 950 controllers.

FIG. 10 illustrates that DRM 995 detected excessive workload and nBE_SAN controller 950 overload condition and further redistributes (rebalances) the workload across nBE_SAN 951 and 952 controllers creating multi-level (n)BE_SAN 952, 951, 950, 932, and 912 controller configuration.

FIG. 11 illustrates that Distributed Resource Managers (DRMs) 996, 993, 995, 994, and 992 detected moderate workload directed to BE_SAN 912. Because the overload condition has subsided and the BE_SAN controller 912 can handle all the I/O workload sent to it, DRM 992 coordinates with other DRMs all dirty buffers to be flushed to the BE_SAN 912; after the flush/sync process is completed DRMs dynamically rebalance the system again by freeing up nBE_SAN controllers 950, 951, and 952 and BE_SAN controller 932. Hoverer, if excessive workload is detected again anywhere in the system on one or more controllers, DRM will dynamically reconfigure the system again to alleviate the overload condition.

FIG. 12 depicts how this multi-level dynamically reconfigurable data access technology can be integrated with public and/or private clouds 1200 as well as with cloud storage 1201 to accelerate data access speed by leveraging cloud storage cache (high-performance storage tier) 1203 to boost application performance, datacenter efficiency, and lower total cost of ownership.

FIG. 13 shows a flow diagram of an embodiment of a method of the present invention when write-back-with-mirroring is enabled to nFE_SAN controller's redundant memory buffers, data transfer phase from nFE_SAN to BE_SAN controller(s), and once the data transfer has completed one of the allocated memory buffers on the nFE_SAN controller gets released.

FIG. 14 illustrates a flow diagram of an embodiment of a method of alleviating controller overload condition by caching certain LBA segments on different nBE_SAN controller(s); thus, delegating part of its workload to additional controller(s).

FIG. 15 demonstrates a flow diagram of an embodiment of a method of restoring the original controller system configuration by releasing the additional controllers once the overload condition ends.

FIG. 16 (PRIOR ART) represents a dataflow diagram of write operations showing time saved and overlap times of write operations using a system disclosed in the U.S. Pat. No. 9,118,698 (571770). Write data has to be mirrored between FE_SAN and BE_SAN controller(s) before "COMMAND COMPLETE" message can be sent to the host.

FIG. 17 represents a dataflow diagram of write operations showing time saved and overlap times of write operations using the present system. Because two copies of the data are maintained by the nFE_SAN controller "COMMAND COMPLETE" message can be returned to the host as soon as data transfer from the host is done and write lock(s) acquired from (n)BE_SAN controller(s).

FIG. 18 depicts Data Access System with first and second cache 1812 and 1818, first and secondary power system 1810 and 1816, first and second network interface 1814 and 1820, and first and secondary processor 1824 and 1826 together form an nFE_SAN controller as herein described.

DETAILED DESCRIPTION OF THE EMBODIMENTS

Figure 5:
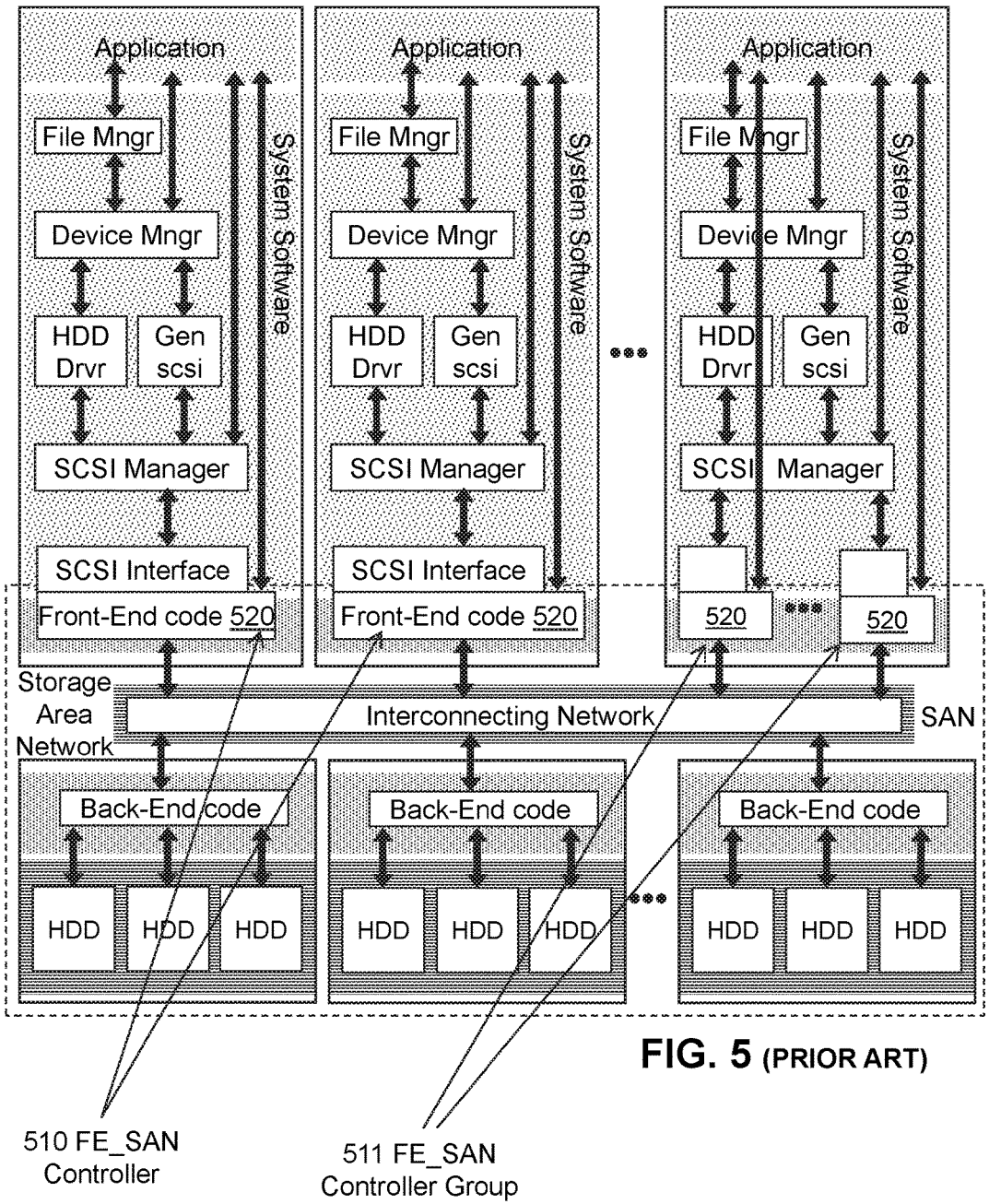
FIG. 5 (PRIOR ART) is a system view of I/O related layers to access virtual disk (LUN) utilizing the new SAN architecture. Same as in traditional SAN solutions, the host has notion of having an ordinary SCSI device (disk drive or RAID controller) attached to it. The Front-End code creates a virtual device (virtual volume or LUN) that supports all (but not limited) mandatory SCSI commands; other storage interfaces/protocols may be supported as well. However, using the same method any other device could be emulated such as tape drive, DVD drive, etc.

FIGS. 3, 3a, 3b, 6, 7, 8, 9, 10, 11, 12, 13, 14, 15, 17, and 18 present a system. There are two parts to this system. FIGS. 3, 3a, 6, 7, and 17 reveal improvements over the prior FE_SAN controller of U.S. Pat. No. 9,118,698, FIG. 3b depicts improvements over the BE_SAN controller of U.S. Pat. No. 9,118,698, while FIGS. 9, 10, and 11 illustrate a method and technique utilized to eliminate hotspots related to (n)BE_SAN controller(s) overload condition by dynamically reconfiguring (n)BE_SAN controller(s) configuration. FIG. 12 depicts how this data access system may be integrated with public and private clouds and how it can be used as high-performance data cache or block storage tier for cloud storage, remote storage, archive, etc.

FIG. 3 illustrates the hardware architecture that enables nFE_SAN 300 controller to keep a redundant copy of the write data locally which eliminates a need to mirror the data to the BE_SAN controllers before returning "COMMAND COMPLETE" message to the host. However, as soon as the data is copied to the (n)BE_SAN controller(s), one of the memory buffers (either 302 or 352) containing redundant copy of the data may be released. However, we can accomplish the same effect by configuring a host with two FE_SAN controllers (FIGS. 1 and 2) similar to those of U.S. Pat. No. 9,118,698 where a device driver creates copies of the same data on both FE_SAN controllers. Such solutions may be more expensive than the nFE_SAN 300 controller depicted in FIG. 3, and may require two PCIe (or other type) slots instead of one. Similarly, it is possible to, in addition to caching write data in the FE_SAN 201 controller's memory 202, to keep second copy of the data in the FE_SAN controller's device driver 620a or software module allocated memory in the host (FIG. 6). Thus, one copy of the data would exist on the FE_SAN 201 controller while the second copy of the same data in the host main memory. Once the data is transferred to the (n)BE_SAN controllers, the allocated data buffers in the host OS 680 (FIG. 6) are released. However, such method may consume more host main memory bandwidth compared to the hardware implementation involving two or more FE_SAN 201 controller group, or using nFE_SAN 300 controller depicted on FIG. 3. In addition, this method may be less reliable than the previously described method because servers and compute nodes may lose power, fail, or crash at any time and they are not always protected with uninterruptible backup power systems or devices such as battery backup or ultra-capacitor backup.

Host read/write command execution and algorithms to process storage I/O commands in parallel remains similar to that as described in U.S. Pat. No. 9,118,698 entitled "Scalable Data Storage Architecture and Methods of Eliminating I/O Traffic Bottlenecks". However, the new nFE_SAN 300 controller design enables a redundant copy of write data to be maintained locally on the nFE_SAN controller card without the need to first traverse the network fabric and store the data on BE_SAN controller(s) before returning "COMMAND COMPLETE" message to the host. To further explain how nFE_SAN controller improves write performance, if write-back-caching-with-mirroring is enabled, the write data is simultaneously transferred, using Copy-on-Write (CoW) to two independent memory buffers 302 and 352 and a "COMMAND COMPLETE" message is returned to the host OS as soon as the data transfer is completed and lock(s) from (n)BE_SAN controller(s) acquired. Thus, the key feature of the nFE_SAN 300 controller design is that the two independent memory buffers 302 and 352 and corresponding processing 303 and 353 and network components 320 and 321 are functionally and physically self-sufficient, effectively creating two operationally independent controller cards (FE_SAN 301 controller and nFE_SAN-S 350 sub-controller). However, a single nFE_SAN 300 controller may be presented to the host OS while the underlying complexity is hidden away from the host OS and user. This design also mitigates single-point-of-failure issues. De-staging of the nFE_SAN 300 controller data cache to (n)BE_SAN controller(s) is done as soon as possible and upon its completion the one of the memory buffers 302 or 352 may be released keeping one copy of the data in the nFE_SAN 300 controller. However, in order to improve performance and support for virtual environments, the device driver together with nFE_SAN firmware may present multiple virtual nFE_SAN 300 controllers to the host OS, hypervisor manager or other virtualization layers, guest OSs, and their applications.

FIG. 3b depicts an nBE_SAN 370 controller of an embodiment with an integrated nFE_SAN 300 controller. However, it is also entirely possible to integrate lower cost FE_SAN 301 controller with BE_SAN 371 controller. Obviously, whether FE_SAN 301 or nFE_SAN 300 controller is integrated and used depends on the reliability, resiliency, performance, and cost requirements. Furthermore, NVMe based or other flash storage (SSD) 374 may be integrated to absorb extended I/O bursts, reduce memory requirements, and also to cache frequently read data locally.

SCSI standard defines device interface model and SCSI command set for all SCSI devices. For purposes of this document, a storage device is a disk drive such as a traditional hard disk, a flash-memory based "thumb drive", a solid-state disk (SSD), non-volatile memory express (NVMe), an optical storage device such as a digital versatile disk (DVD-RW) or blue-ray drive, or other block-oriented machine-readable drive as known in the computing industry. One of the key roles (function) of a SCSI device interface is to protect data residing on the SCSI device from misbehaving host. The SCSI command set is designed to provide efficient peer-to-peer (initiator-target) operation of SCSI devices (HBAs, disks, tapes, printers, etc.). However, with improvements in non-volatile memory, flash memory, and SSD technology, the new solid state based persistent memory devices have outperformed legacy SCSI interface which became performance bottleneck. Thus, in recent years a new set emerging storage industry interface standards have been developed to overcome the legacy SCSI standard shortcomings. The new storage interface standards include SCSI Express (SCSIe), Non-Volatile Memory Express (NVMe), and other proprietary computer manufacturer peripheral device standards. (n)FE_SAN controllers can readily take advantage or the newly developed standards to further reduce latency and boost transfer rate between host memory and nFE_SAN controller memory 302 and 352. Furthermore, multiple FE_SAN/nFE_SAN controllers attached to a host via host or memory bus may be configured as a controller group conforming to legacy SCSI as well as new and emerging peripheral/storage device interface standards.

In an embodiment, on the host side, the nFE_SAN and FE_SAN controllers, in addition to conforming to Small Computer System Interface (SCSI) set of standards, also support new and emerging industry storage standards such as SCSI Express (SCSIe), Non-Volatile Memory Express (NVMe), as well as other proprietary computer manufacturer peripheral device standards. Still, multiple nFE_SAN/FE_SAN controllers attached to a host may be configured as a controller group conforming to legacy SCSI as well as new and emerging peripheral device and persistent data storage interface standards.

In an embodiment, the nFE_SAN controller is configured such that data is retained in a first write-back cache and transferred to (n)BE_SAN controllers over a first network when a first controller and power supply are operational, retained in a second write-back cache and transferred to (n)BE_SAN controllers over a second network when a second controller and power supply are operational, the first and second controllers and power supplies being independent. This configuration provides for storage and transmission of write-back cache data from the nFE_SAN controller to the (n)BE_SAN controller even if there is a failure of one unit selected from the group of the first and second controllers, the first and second network, and the first and second write-back cache, and first and second power supplies.

Furthermore, the new (n)FE_SAN controller firmware is configurable to logically partition and virtualize controller hardware and software resources to facilitate virtualized and cloud environments such as VMware, OpenBox, Microsoft Hyper-V, KVM, Xen, etc. Thus, a single physical (n)FE_SAN controller may present a number of different virtual controllers with different controller properties to different Virtual Machines (VMs) on the same physical server.

The, (n)FE_SAN controller may be provided in different physical formats but not limited to PCI, PCIe, SBus, or memory channel interface board formats. However, (n)FE_SAN controller may support a number of host buses such as PCI, PCIe, SBus, the IBM Coherent Accelerator Processor Interface (CAPI), QuickPath Interconnect (QPI), HyperTransport (HT), and various memory channel interface standards, to mention a few. In addition to basic functionality, such as SCSI device discovery, error handling and recovery, and some RAID functionality, each (n)FE_SAN interface card has firmware (software) that supports additional services and features such as compression, encryption, de-duplication, thin provisioning (TP), snapshots, remote replication, etc. The nBE_SAN controller (back-end) may be provided in a number of different physical formats such as in the standard disk drive enclosure format (including 19 inch rack and standalone enclosures), or an integrated circuit that is easily adaptable to the standard interior configuration of a SAN controller.

In an embodiment, the hardware design of a nBE_SAN controller may include integration of one or more of nFE_SAN or FE_SAN controller(s) that enables the controller to operate as BE_SAN controller when servicing requests from other (n)FE_SAN controllers and to act as nFE_SAN or FE_SAN controller when initiating requests and sending data to other BE_SAN or nBE_SAN controller(s). The hardware design and new firmware features of nBE_SAN controller enable dynamic reconfiguration of the data access (storage) system and creation of multi-level (n)BE_SAN controller configurations.

A number of different storage interfaces may be supported at the back-end of a nBE_SAN controller, including legacy device standards such as SCSI, SAS, Advanced Technology Attachment (ATA), Serial ATA (SATA), FC, and emerging new standards such as NVMe, SCSIe, and other similar disk storage as well as PCI Express (PCIe), QuickPath Interconnect (QPI), HyperTransport (HT), CAPI, memory channel interfaces, etc.

Each (n)BE_SAN controller has firmware (software) that supports legacy features such as SCSI device discovery, fault management, RAID functionality, remote direct memory access (RDMA) capability, and error handling functionality as well as new features such as erasure coding, workload monitoring and when necessary workload sharing with other (n)BE_SAN controllers. The firmware on each (n)BE_SAN controller provides all necessary functionality to support legacy target disk storage interfaces such as SCSI, SAS, ATA, SATA, or FC disk drives, as well as PCIe or CAPI directly attached flash storage supporting emerging standards such as NVMe and SCSIe. In addition, (n)BE_SAN controller resources may be partitioned and virtualized to facilitate guest OSs and applications enabling user code to be executed on the (n)BE_SAN controllers.

In an embodiment, both (n)FE_SAN and (n)BE_SAN have firmware that provide Application Programming Interface (API) and Application Binary Interface (ABI) to allow host operating system (OS), guest OSs, and applications to memory-map a file or part of a file to directly access file and/or block data bypassing OS stack and SCSI/storage layers. Because of its hardware architecture and new firmware features (see FIGS. 2, 3, and 3*a*), (n)FE_SAN controllers may simultaneously support network and storage I/O traffic facilitating Converged I/O Interface (CIOI). Thus, (n)FE_SAN controller may provide Network Interface Card (NIC) as well as storage controller functionality.

In an embodiment, (n)FE_SAN controllers are host dedicated resources while (n)BE_SAN controllers are shared resources. As with every shared resource, it is possible to encounter a condition in which the workload sent to a shared resource exceeds the capacity of that resource which may cause the resource to be overwhelmed and driven into saturation over a prolonged period of time. It is probable and expected that different parts of a storage system will be utilized at different levels and that the utilization will vary over time. Thus, if a particular I/O workload disproportionately targets a specific (n)BE_SAN controller or set of controllers exceeding the controller(s) performance limits, the overload condition can be alleviated by caching selected LBAs on other (n)BE_SAN controller(s) that are not experiencing an overload condition at the same time. Thus, when Distributed Resource Manager (DRM) detects excessive workload on a BE_SAN/nBE_SAN controller(s) (overload condition), it coordinates with other DRMs to redistribute (rebalance) the workload across one or more of additional (n)BE_SAN controllers by inserting them in the I/O path in front of the overloaded (n)BE_SAN controller. Using the same method, one or more of spare (n)BE_SAN controllers may be dynamically added to the (n)BE_SAN controller cluster configuration to further boost I/O processing and bandwidth performance in order to alleviate (n)BE_SAN controller(s) overload condition. Additionally, if a LUN is attached to two or more (n)BE_SAN controllers, DRM may find that the system is better utilized if the LUN or part of that LUN from the (n)BE_SAN that experiences overload condition is transferred to another (n)BE_SAN controller that has direct access to the LUN.

Furthermore, as (n)BE_SAN controller resources may be partitioned and virtualized to support guest OSs and applications, FE_SAN controller functionality may be implemented in one or more software modules in the firmware to be executed in a physical or logical partition. Yet, (n)FE_SAN chipsets may also be embedded within nBE_SAN controller for additional speed, reliability, and cost savings.

FIG. 5 (PRIOR ART) illustrates high-level host I/O stack and Front-End firmware API and ABI providing direct access to the FE_SAN controller memory buffers. UNIX/Linux system calls such as mmap( ), munmap( ), msync ( ), mprotect( ), and madvise( ) or equivalent may be used to manage the file data and memory access.

FIG. 6 embodies a partitioned and virtualized (n)FE_SAN 610 controller with front-end firmware 620, OS stack 680, and SCSI layers 621, 622, 623, and 625. (n)FE_SAN device driver and related modules 620a, resides in between Front-End code 620 and SCSI Interface 621. The new front-end firmware 620 has a feature that simultaneously supports both host OS 680 and guest OSs 682 and applications 627 providing direct access to the Front-End firmware 620 and to the allocated memory buffers. Furthermore, (n)FE_SAN controller firmware 620 provides API and ABI. The provided API and ABI enable guest OSs 682 and applications 627 running in VMs to interact directly with the firmware 620 and to access the allocated resources. In addition, multiple (n)FE_SAN controllers attached to a host may be configured as a controller group 611. The firmware 620 may partition and virtualize the entire controller group 611 and present a number of virtual nFE_SAN controllers to the host OS 680 and guest OSs 682. Thus, additional functionality including partitioning and virtualization is added to the previously disclosed FE_SAN controller 510 and the Front-End firmware 520 capabilities and feature set.

FIG. 7, illustrates how memory buffers may be allocated, mapped, and distributed in an embodiment across a number of nFE_SAN 772 and 774 and BE_SAN (or nBE_SAN) 712, 732, and 750 controllers. Front-End firmware running on nFE_SAN 772 and 774 controllers allocates and manages local memory buffers 772a, 773a, 774a and 775a, upon receiving a request from an application or host OS via provided API and ABI to map a file or portion of a file into application address space. As presented in FIG. 7 Front-End firmware allocates all necessary memory buffers including redundant memory buffers 773a and 775a on nFE_SAN-S 773 and 775 sub-controller (also please see FIG. 3). Because, nFE_SAN memory buffers are exposed in an application user space, when the application writes to the nFE_SAN controller "mmapped" (memory mapped) memory buffers 772a and 774a, Copy-on-Write mechanism automatically mirrors the data into the allocated redundant memory buffers 773a and 775a on the nFE_SAN-S sub-controller 773 and 775 and initiates data transfer to the corresponding BE_SAN controller(s) 712, 732, and 750. The size of the allocated redundant/mirrored nFE_SAN memory buffers 772a and 773a needs to be sufficient to keep the data until the data transfer between nFE_SAN 772 and BE_SAN 712, 732, and 750 (or nBE_SAN) controllers is completed.

Applications running on the hosts 780 and 782 (FIG. 7) request to map a file or portion of a file into their respective address spaces. Front-End firmware running on nFE_SAN 772 and 774 controllers sends a request, as needed, to the corresponding Back-End firmware running on BE_SAN 712, 732, and 750 controllers to process the request. The memory buffers are dynamically allocated and managed upon a specific memory location (and corresponding LBA) is accessed. The copy-on-write method is used to automatically copy data from nFE_SAN "mmapped" memory buffers 772a to the mirrored buffers 773a (which may be dynamically allocated and released) and corresponding memory buffers 712a, 732a, and 750a allocated on the BE_SAN (or nBE_SAN) controllers. It is presumed that the application(s) that were granted direct memory access to the nFS_SAN 772 and 774 controllers' memory buffers assume complete control and responsibility for synchronizing and maintaining data coherency. Furthermore, provided API and ABI provide facility to allocate and allow direct access to the memory buffers on nFE_SAN 772 and 774 (FE_SAN) of the requested LBA(s) outside of a file system. As previously stated, user/application needs to assume complete control and responsibility for data management when using this feature.

FIG. 8 illustrates a scenario where a heavy I/O workload from multiple hosts 880 and 882 (via FE_SAN/nFE_SAN controllers 872 and 874) saturates BE_SAN 812 controller. Distributed Resource Manager (DRM) 892 detects the overload condition and coordinates resource allocation information with other DRMs (894 and 895) to find an optimal solution that alleviates the BE_SAN 812 overload condition and maximizes aggregate system performance.

In an example FIG. 9 further clarifies a scenario where BE_SAN 912 experiences excessive I/O workload while controllers BE_SAN 932 and nBE_SAN 950 are lightly utilized. The DRM algorithm finds that the optimal solution is to split the I/O traffic directed to the most frequently accessed LBAs on BE_SAN 912 into three segments (LBAs-1, LBAs-2, and LBAs-3). Then LBAs-2 and LBAs-3 segments are cached on BE_SAN 932 and nBE_SAN 950 controllers respectively by creating corresponding LBAs-2' and LBAs-3' cache. DRM 992 instructs the FE_SAN controllers 972 and 974 to transparently redirect the I/O traffic originally intended for the corresponding LBAs on BE_SAN 912 controller to be sent (from now on) to BE_SAN 912 if the LBA address range falls within LBAs-1 range, to send to BE_SAN 932 if the accessed LBAs fall within LBAs-2 range, or to send to nBE_SAN 950 if the targeted LBAs fall within LBAs-3 range. Although, both BE_SAN 932 and nBE_SAN 950 may be used to improve the aggregate Back-End processing power and bandwidth during excessive I/O workload periods, the key difference between BE_SAN 932 and nBE_SAN 950 is that nBE_SAN 950 has additional hardware which provides additional performance acceleration (for additional information, please see FIG. 3b). In this example, if all three nBE_SAN/nBE_SAN 912, 932, and 950 controllers have the same performance, assuming that initially the BE_SAN 932 and nBE_SAN 950 controllers were idle, by utilizing the described technique for the previously depicted scenario the peak aggregate performance for that specific workload could be increased as much as 300%. It is apparent that if sufficient hardware resources are provided, that significant performance gain may be attained during busy periods and the performance gain is limited only by the available hardware resources. Obviously, the long duration average I/O bandwidth (data rate) directed to the BE_SAN controller 912 has to be lower than the controller bandwidth and attached back-end storage devices aggregate bandwidth.

In the previously described example, all the configuration changes to LBA caching occur transparently in respect to the host computers 980 and 982. In addition, BE_SAN 912 controller views BE_SAN 932 and nBE_SAN 950 controllers as FE_SAN (nFE_SAN) controllers when receiving requests directed to LBAs-2 and LBAs-3 segments. Furthermore, as described in the paragraphs [0041 through 0045] of the U.S. Pat. No. 9,118,698, (PRIOR ART) the utilized locking algorithm is the same between BE_SAN 932 and 912 (or BE_SAN 950 and nBE_SAN 912) as, for instance, between FE_SAN 972 and BE_SAN 912. Thus, with this new firmware features, (n)BE_SAN 912, 932, and 950 controllers may play (n)BE_SAN controller role when servicing (n)FE_SAN 972 and 974 controllers' requests and to assume (n)FE_SAN controller's role when caching LBAs (data) from another (n)BE_SAN controller.

FIG. 10 depicts a scenario in which DRM 995 detected excessive utilization on the nBE_SAN 950 controller and determines that the optimal solution is to split the I/O traffic directed to the most frequently accessed LBAs into two segments (LBAs-3.1' and LBA-s3.2'). It may be appropriate to mention that LBA-3.1' and LBA-s3.2' do not have to be of the same size. Then LBAs-3.1' and LBAs-3.2' segments are cached on the nBE_SAN 951 and 952 controllers respectively. DRM 995 instructs the (n)FE_SAN 972 and 974 controllers to redirect the I/O traffic intended for LBAs on nBE_SAN 950 controller transparently to the host, sending traffic to nBE_SAN 951 if the LBA address range falls within LBAs-3.1' range and to send to nBE_SAN 952 if the accessed LBAs fall within LBAs-3.2' range. As it can be seen in FIG. 10 the new dynamically created controller configuration takes shape of multi-level storage controller topology. Furthermore, the storage controller configuration and topology may be policy driven, which gives administrators additional tools and flexibility to further tune the system performance for specific workloads.

FIG. 11 Once the overload condition on BE_SAN controller 912 is alleviated, all the remaining cached data on the nBE_SAN 952, 951, and 950 and BE_SAN 932 controllers are orderly de-staged to the BE_SAN controller 912 and the memory buffers LBAs-3.1", LBAs-3.2", LBAs-3.1', LBAs-3.2', LBAs-3' and LBAs-2' segments are released. Thus, nBE_SAN 950, 951, 952, and 953 are released and made available to be deployed if another hotspot (overload condition) is detected anywhere in the systems. Similarly, if nBE_SAN 950 controller detects moderate workload while BE_SAN 912 still experiences overload condition, DRM 995 may initiate data flush from nBE_SAN 951 and 952 controllers. Once all data is de-staged from LBAs-3.1" and LBAs-3.2" to the nBE_SAN 950 controller, the segments LBAs-3.1" and LBAs-3.2" are released and nBE_SAN 951, and 952 are freed; thus, restoring the previous system configuration depicted in FIG. 9.

The system allows to add/deploy as many (n)BE_SAN controllers 950, 951, 952, 953, etc. as needed to satisfy quality of service during busy periods. Typically, the additional nBE_SAN controllers may be the same or similar as nBE_SAN 950. nBE_SAN 950 may make use of one or more SSDs, PCIe Flash Memory cards, or additional NVRAM or other persistent memory devices to mitigate cache-full condition during extended periods of heavy writing. In addition, it may cache frequently read (accessed) LBAs to boost read performance. Furthermore, in Network Attached Storage (NAS) systems or file systems using file servers, the same concept may be used to alleviate a file server overload condition; thus, this technique may be universally applied to broad range of applications.

FIG. 12 illustrates how the apparatus disclosed in the embodiment of this application may be used as data cache or high performance storage tier 1203 for cloud storage 1201, archive, or remote storage and how (n)FE_SAN 1272 and 1274 controllers may be integrated and utilized with private and public cloud 1200 deployments to improve application performance by accelerating data access speed. Furthermore, as depicted in FIGS. 2, 3, and 3a, and as described in paragraph [0015], integrating (n)FE_SAN 1272 and 1274 controller with a NIC to support Converged I/O Interface may be recommended.

FIG. 13 illustrates an example of how nFE_SAN 300 (FIG. 3) controller speeds up writes when write-back-caching-with-mirroring is enabled. nFE_SAN controller receives write command 1300 from the host. Front-End firmware immediately sends write-lock request 1310 to the appropriate (n)BE_SAN controller(s). In addition, it simultaneously requests 1320 write memory buffers (302 and 352) from 301 and 350 (FIG. 3) controllers. Then front-end firmware initiates data transfer 1322 from the host memory to the allocated memory buffers on the nFE_SAN controller. In parallel, the firmware checks if the requested lock(s) from the nBE_SAN controller has/have been granted 1330. Once the data transfer is complete in 1322 and locks acquired from (n)BE_SAN controller(s) (see 1331), the firmware sends "COMMAND COMPLETE" the host OS in 1333. Also, as soon as the lock(s) were granted and data transfer 1342 to the (n)BE_SAN controller is initiated. Once the transfer from nFE_SAN controller to (n)BE_SAN controller has been completed, in this example, the firmware 1343 releases corresponding buffers on nFE_SAN-S sub-controller. This completes this example 1344. However, if in step 1330 the lock hasn't been granted, then in this simplified example 1341, the firmware will retry to obtain lock(s) from the nBE_SAN controller(s) until it either obtains lock(s) or times out; if the time-out occurs then the issues is passed to the upper system management layers. For all practical purposes, we assume that the system is operational and therefore it does grant requested locks every time.

FIG. 14 illustrates an example of how (n)BE_SAN handles excessive workload and how the controller DRM (DRM.a) alleviates controller overload condition. When firmware detects controller overload condition, it sends overload_condition( ) notification to its DRM.a 1400. Then, 1420 DRM.a checks workload statistics check_stats( ) and in 1430 identifies which LBAs have been accessed most often. In 1431 DRM.a gets the controller utilization from other (n)BE_SAN controllers. In 1432 DRM.a creates a list of the controllers and LBAs that will be cached on those controllers. In the next step, 1433, DRM.a sends a request for resources to the first identified controller (DRM.b). In 1440 DRM.b receives request for resources from DRM.a (which is granted). In case that a resource is not granted for some reason in step 1440, "N", DRM.a identifies another controller and requests resources for the same LBAs, (step 1433). DRM.b sends confirmation message which LBAs will be cached (1441) to DRM.a. In 1442 DRM.a checks if there are more segments that need to be cached and if "Y" starts the process again from step 1433. However, in this simplified example, no more segments need to be cached on other controllers, the answer is "N" and the algorithm proceeds to step 1443. In 1443 DRM.a sends new LUN layout information (map) to all (n)FE_SAN controllers which can access that LUN. The new map that contains information about new (n)BE_SAN controller topology.

In another example, FIG. 15, it is shown how the system returns to its original configuration once the overload condition has ended. DRM.a gets a notification that overload condition has ended 1500. DRM.a retrieves a list of all cached LBAs and corresponding controllers, 1520. Then it gets workload statistics from each controller on the list for the LBAs that have been cached on that controller, 1532. In 1533 it retrieves information which controller will be freed first/next. Then DRM.a sends DRM_release_resource( ) request in 1534 which implies that related cached LBAs should be synced first. Controller cache gets synhed; DRM_cache_synced( ) succeeds in 1540 and DRM_release_resource( ) request succeeds in 154. Then DRM.b sends DRM_release_resource( ) notification in 1541 and starts "writing through" all incoming write requests. Then in step 1542 it checks if there are more cached LBA segments that should be restored. If the answer is yes, then the process starts again from step 1533. If in step 1540 DRM on the alternate controller fails to release the allocated resources then the DRM simply proceeds with freeing up resources on the other controllers and retries to release resources after went through the entire list. If for some reason, DRM_cache_released_LBAs( ) did not succeed then DRM.a proceeds with freeing up all other resources until all the resources are free and original configuration restored or the process times out and upper management layers take over the process. However, for this exercise, the system is fully operational and all the resources eventually will be freed. Thus, when all LBAs are released, DRM.a sends a DRM_new-map_LBAs( ) message to all (n)FE_SAN controllers that have access to the previously cached LBAs. During normal operation, each of these requests should succeed almost immediately on the first request. Only in case that a controller is temporarily overloaded, it may be possible to observe a delayed completion of a request. The goal for the examples presented here is to give an insight into the basic system operation without going into great level of detail covering more complex scenarios. Furthermore, these examples do not cover error handling, error recovery and failure (degraded) modes of operation.

Key Features

The original FE_SAN design FIG. 2 has one CPU, memory, etc. With reference to FIGS. 3 & 3*a*, the new design consists of a FE_SAN 301 controller and nFE_SAN-S 350 sub-controller card or chip.

($n$FE_SAN 300)=(FE_SAN 301)+($n$FE_SAN-S 350)

The nFE_SAN-S 350 sub-controller is operationally, functionally, and electrically independent of the FE_SAN 301 controller.

To keep the cost down, the performance CPU and memory capacity requirements of the nFE_SAN-S 350 controller may be significantly lower compared FE_SAN 301 controller, while the memory bandwidth requirement cannot be lower than the host side bus (channel) bandwidth. Both controllers 301 & 350 are physically built into a single PCI, PCIe, or other standard card format.

Traditionally, write-back-cache-with-mirroring feature requires to maintain at least two copies of the write data until the data is written to the back-end HDDs, SSDs, or other permanent storage media. In that respect, this implementation does not have single point of failure while the data coherency is maintained via locking mechanism which maintains the information where each piece of data may be found and retrieved from.

With the original design, FIG. 1, the write data has to be mirrored front-to-back (FE_SAN→BE_SAN controller) by sending the data over the network before "COMMAND COMPLETE" message could be returned to the host. However, with the new design the write data is simultaneously written to both MEM 302 and 352 on the controller nFE_SAN 300 and then as soon as the lock(s) are granted by (n)BE_SAN controller(s) the "COMMAND COMPLETE" message is immediately returned to the host without the need to first "mirror" the data to the nBE_SAN controller(s); apparently this method is significantly faster and it is comparably reliable as the original method. The SCSI standard does not guarantee the order in which SCSI commands are executed. Therefore, if we relax the ordering requirement, "COMMAND COMPLETE" message may be immediately returned to the host without waiting for lock(s) to be granted by nBE_SAN controller(s). However, if the order of execution has to be guaranteed, every request has to be associated with an appropriate lock.

FIG. 3*a* depicts new FE_SAN controller with additional NVMe/SSD or other permanent storage media (nFE_SAN 300*a*)=(nFE_SAN 300 FIG. 3)+(SSD 304). NVMe/SSD 304 with nFE_SAN 300 creates nFE_SAN 300*a* controller; 304 could be a high-speed NVMe based flash memory or NVRAM device/chip. This enables 300*a* controller to keep more write and read data locally; the flash memory may have TBs of capacity as the price of SSD and NVMe technology continue to decline. An additional feature allows for keeping of some specific blocks locally in the nonvolatile or flash memory. For instance we could keep entire boot image locally for fast boots, without the need to go to the BE_SAN controllers to retrieve the boot image; the remainder of local NVRAM is available as additional cache. However, broadcasting/multicasting boot image from nBE_SAN to (n)FE_SAN controllers my result in significantly faster boot process because the boot image would be retrieved from the nFE_SAN controller cache which uses the fastest memory technology available.

As depicted on FIG. 3*b* the improved nBE_SAN controller 370 consists of BE_SAN 371 with additional SSD 374 and nFE_SAN 300 or FE_SAN 301:

($n$BE_SAN 370)=(BE_SAN 371+SSD 374)+($n$)FE_SAN

The additional features of the nBE_SAN controller 370 enable the Data Access System to dynamically change its topology to adapt to the changing workload requirements. Thus, a (n)BE_SAN controller can be automatically and dynamically inserted in front of another (n)BE_SAN controller to boost its I/O processing capability by caching certain LBAs from the (n)BE_SAN controller. Thus, it behaves as BE_SAN 371 controller when receiving commands from (n)FE_SAN controller(s) and as nFE_SAN 300 when forwarding the data to a BE_SAN controller. nBE_SAN controllers also have new firmware with Distributed Resource Manager (DRM) and virtualization capability to run guest OS and user applications on the nBE_SAN controller.

Each (n)BE_SAN controller may incorporate a multi-core CPU server motherboard with sufficient memory and additional components such as battery backup, NVRAM and NVMe SSDs, etc. Thus, each (n)BE_SAN controller is capable of running VMware or any other virtualization software to allow user application to run on the (n)BE_SAN controllers. Therefore, (n)BE_SAN controller provides capability to locally run applications or execute user code close to the dataset that it needs to process.

FIG. 1 (PRIOR ART)—As disclosed in the original patent, it is possible to install and configure two or more FE_SAN controllers in a server to create a controller group aggregating the I/O performance and capacity of all installed FE_SAN controllers. Then, the controller group is presented by the device driver to the host OS as a virtual FE_SAN controller with significantly higher performance compared to a single FE_SAN controller.

FIG. 6—with the new firmware 620, (n)FE_SAN controller can virtualize its resources using hypervisor or other virtualization method to create multiple virtual (n)FE_SAN controllers 610 and present different VIRTUAL controllers with different features and properties to different OSs 680, guest OSs 682, and applications 627. In addition, as depicted on FIG. 6, the new firmware 620 features, provide facility to virtualize (n)FE_SAN controller group 611 and present virtual (n)FE_SAN controllers to different OSs and guest OSs.

FIG. 7—As described in [0008] the data is written simultaneously to both memory buffers 772a and 773a on the nFE_SAN 772 controller and based on the mode pages, the firmware may immediately return "COMMAND COMPLETE" to the host without the need to, first, write data to the BE_SAN controller(s). Then the data is de-staged (flushed) to the BE_SAN controllers at the first opportunity and the buffers with one copy of the data (either 772a or 773a) are released while the second copy of the data is retained maintaining front to back mirroring. Thus, there is one copy of the data on the nFE_SAN 772 controller and second copy of the data on (n)BE_SAN controller(s) (on one or more of 712, 732, or 750 controllers). Once the data is mirrored between nFE_SAN and (n)BE_SAN controller(s), the system is at the same state as described in the original patent when write data is mirrored between FE_SAN and BE_SAN controller(s). Thus, the process of writing the data to the back-end storage devices (drives) is identical to the process described in the original patent. It is apparent that by maintaining two copies of the data at any point in time, the new nFE_SAN 772 hardware and data handing method provides write speed up while maintaining data integrity and reliability at the same level as any other modern SAN or RAID systems that utilize write-back caching with mirroring.

FIG. 8—in this example, applications running on computers 880 and 882 produce intensive I/O workload, writing the data to the same LBAs on BE_SAN controller 812, driving the controller into saturation due to excessive workload. Distributed Resource Manager (DRM) 892 receives notification of the BE_SAN 812 controller extended overload condition. DRM then looks at the distribution of the writes, which LBAs are accessed most often. After reviewing the statistics and finding optimal solution, DRM 892 decides to split this with heavily used LBAs segment on BE_SAN 812 into three smaller segments LBAs-1, LBAs-2, and LBAs-3 (please see FIG. 9). Then DRM 892 further coordinates with DRMs 894 and 895 on other BE_SAN, it may find that BE SANs 832 and 850 have low utilization or that they are idle.

FIG. 9—Thus, if an under-utilized (n)BE_SAN controller is found (say DRM 994 and 995), DRM 992 instructs DRM 994 to create LBAs-2' and DRM 995 to create LBAs-3' cache. Thus, LBAs-2' acts as cache and points to LBAs-2, the same applies for LBAs-3' and LBAs-3 that are utilized to offload the heavily utilized (n)BE_SAN controller. Then DRM 992 instructs (n)FE_SAN controller(s) DRM 999 and 998 to stop sending data to LBAs-2 and LBAs-3 on the original BE_SAN 912 and instead start sending the newly written data to the offloaded LBAs-2' and LBAs-3' on the controllers (n)BE_SAN 932 and 950 controllers. BE_SAN 932 has new firmware that allows LBAs-2 caching in the LBAs-2' buffers. Thus, the write data from nFE_SAN controllers, after data aggregation and coalescing is forwarded to the LBAs-2 on the BE_SAN 912 controller. This is firmware only implementation, however, nBE_SAN 950 has firmware and nFE_SAN hardware (such as nFE_SAN 972 controller card or silicon) integrated within nBE_SAN 950 controller that speeds up writes to the BE_SAN 912 controller. This technology enables more scalable and less expensive controllers because the controllers do not have to be over-engineered to deliver expected peak performance. Less powerful CPUs would work perfectly fine as long as there is sufficient front-end and back-end I/O bandwidth. Thus, FIG. 9—depicts the new (n)BE_SAN controller topology with two levels of (n)BE_SAN controllers. Therefore, the (n)BE_SAN controller topology may change dynamically so the storage system can adapt to workload requirements in real-time.

FIG. 10—illustrates (n)BE_SAN controller topology with THREE levels of (n)BE_SAN controllers. Therefore, (n)BE_SAN controllers can dynamically and in real-time adapt to any type of workload up to the point when all (n)BE_SAN controllers are configured to handle storage I/O workload.

As shown on FIG. 11—the storage system maintains optimal level of service and resource utilization by dynamically in real-time responding to the workload requirements by deploying additional hardware resources when and where they are needed and freeing up unutilized resources when they are not needed. Apparently, hardware resources, (n)BE_SAN controllers, consume less power when they are idle compared to when they are heavily used. Thus, the additional benefits of this technology is saving power during periods when the system is not heavily used, while boosting performance when the system is heavily used. In addition, unlike with the legacy storage systems designs where a system needs to be architected to meet the peak performance in advance, the (n)BE_SAN controllers may be incrementally added to boost storage system peak performance if and when needed enabling storage performance to scale independently from storage capacity. In this example, DRM 992 on nBE_SAN 912 controller receives notification that the heavy workload sent to the BE_SAN 912 LBAs has subsided and RDMs coordinate the process of de-staging cached data to the BE_SAN 912 attached back-end storage media and restore the initial controller configuration (topology) freeing up nBE_SAN controllers 951, 952, 950, and 932.

In alternative embodiments, instead of automatically offloading or splitting individual LBAs, heavily accessed data or files may be relocated from storage on one BE_SAN to a less-heavily loaded BE_SAN that holds part of the same logical drive. As disclosed in the original U.S. Pat. Nos. 8,347,010, 8,725,906, 9,118,698, and 9,361,038 entitled "Scalable data storage architecture and methods of eliminating I/O traffic bottlenecks," the contents of which are incorporated herein by reference for disclosure purposes, logical and physical drive (volume) location may be dissociated.

FIG. 12—illustrates how herein described embodiment supports and accelerates data access in private and public cloud environments by having (n)FE_SAN controllers installed in cloud servers 1280 and 1282. In addition, it is possible to configure multiple (n)BE_SAN controllers (in this simplified example BE_SAN 1212 and 1232 controllers) to act as block storage high-speed tier (cache) for local and remote cloud storage, online and near-line data archive, and remote replication Disaster Recover (DR) site.

FIG. 16 (PRIOR ART) depicts a dataflow diagram of write operations showing the execution sequence and interaction between application, host SCSI driver, FE_SAN and BE_SAN controllers for a system disclosed in the U.S. Pat. No. 9,118,698 (571770). Write data has to be mirrored between FE_SAN and BE_SAN controller(s) before "COMMAND COMPLETE" message can be sent to the host.

FIG. 17 illustrates timing of a write sequence as executed on a system according to the herein described embodiments, as partially illustrated in FIG. 18. A CPU of CPUs 1802 executing an application 1804 and a driver 1805 associated with an operating system determines a write command to storage is required. The write command 1702 is modified by driver 1805 and passed as an extended write command 1704 with buffer info through bus interface 1809 to FE_SAN 1808.

FE_SAN 1808 has a first, primary, power system 1810, a first cache memory 1812, and a first network interface 1814. FE_SAN 1808 also has a secondary power system 1816, a secondary cache 1818, and in some embodiments a second network interface 1820. FE_SAN operates under control of FE_SAN firmware 1822 executing on a primary processor 1824 and FE_SAN-S firmware 1823 executing on a secondary processor 1826, primary processor powered by power system 1810 and secondary processor 1826 powered by second power system 1816. Primary network interface 1814 couples through a first storage area network interconnect 1830 to a primary network interface 1832 of a BE_SAN 1834, and second network interface 1820 couples through a second storage area network interface 1828 to a secondary network interface 1836 of BE_SAN 1834. BE_SAN 1834 has a primary cache 1838 powered by a primary power supply 1840, and a second cache 1842 powered by a second power supply 1844. BE_SAN 1834 has a primary processor 1846 and a secondary processor 1848 operating under control of BE_SAN firmware 1850 and 1851 respectively. BE_SAN 1834 also has two or more disk drive interfaces 1852, 1854, each coupled to one or more storage drives 1856, 1858, 1860, 1862, 1864, 1866. BE_SAN firmware 1850 is configured to operate one or more virtual drives on storage drives 1856-1866 using a Redundant Array of Independent Drives (RAID) protocol permitting reconstruction of data on the virtual drives should a failure occur of any one of storage drives 1856, 1858, 1860, 1862, 1864, 1866. Also, Erasure Coding (EC) or other method of data protection may be implemented on the system depicted in FIG. 18.

Second cache 1818, secondary power system 1816, second network interface 1820, and secondary processor 1826 together form an FE_SAN_S as herein described.

Once write command 1704 is passed to FE_SAN 1808, FE_SAN 1808 passes a write lock request 1706 to BE_SAN 1834. FE_SAN 1808 also begins processing the write request by instructing 1708 driver 1805, including allocating 1709 and setting up any memory mapped buffers, to begin transferring 1710 data into both the primary and secondary cache 1812 and 1818 using "put (data)" operations. In embodiments where data is written directly to primary cache 1812, that data is copied (CoW) 1711 to secondary cache 1818.

Once the BE_SAN 1834 has locked the destination blocks of the RAID virtual drives maintained on storage devices 1856-1866 to prevent intervening writes from other FE_SANs (not shown), and has allocated buffer space in both its primary and secondary caches 1840, 1838, BE_SAN 1834 responds to FE_SAN 1808 with a lock-request-granted signal 1712.

Once lock-request-granted signal 1712 is received by FE_SAN 1808 and copies 1711 to secondary cache are complete, FE_SAN 1808 provides a write complete "ack" signal 1714 to driver 1805, which passes a command complete signal 1716 to the executing application 1804. Once lock request granted signal 1712 is received by FE_SAN 1808, FE_SAN 1808 begins transferring 1718 the data to BE_SAN 1834 where this data is mirrored in cache memories 1834, 1840.

Write data at this point may reside in duplicate in FE_SAN caches 1812, 1818; while data transfers 1718 continue. When all data is transferred to the BE_SAN, the BE_SAN sends a final acknowledgement signal 1720 to the FE_SAN, which may then release one or both copies in FE_SAN cache 1812, 1818.

In the event transfer is interrupted by failure of the FE_SAN primary cache 1812, primary power supply 1810, primary network interface 1814, or primary processor 1824, after write complete 1714 has been sent to driver 1805, but before all data has been transferred to the BE_SAN, the secondary processor 1826 continues to transfer data from the secondary cache 1818 to the BE_SAN to ensure completion of the write operation. In the event BE_SAN primary processor 1846, primary cache 1838, or primary power 1840 fail, BE_SAN secondary processor 1848 completes receiving the data over BE_SAN secondary network 1836 into secondary cache 1840 and completes writing data to storage devices 1856-1866. In an alternative embodiment, instead of completing the write, the data is retained in battery-backup secondary cache 1840 and alarms sounded; data writing is completed upon repair of the BE_SAN.

As can be seen from the diagram, data transfer between host and nFE_SAN controller is decoupled from the data transfer between nFE_SAN and (n)BE_SAN controller(s). Furthermore, to complete host write I/O transaction it is not necessary to copy the data between (n)FE_SAN and (n)BE_SAN controllers because two independent copies of the data are maintained on the nFE_SAN controller. Therefore, it is sufficient to obtain only write lock(s) from (n)BE_SAN controller(s) and complete data transfer from the host before a "COMMAND COMPLETE" message can be sent back to the host. Once the data is mirrored between nFE_SAN and (n)BE_SAN controller(s) the memory buffers containing the second copy of the data are released. Apparently, this technique facilitates additional performance improvements for small I/O writes because data transfer between nFE_SAN and (n)BE_SAN controllers can be done asynchronously.

The foregoing description should not be taken as limiting. It should thus be noted that the matter contained in the above description or shown in the accompanying drawings should be interpreted as illustrative and not in a limiting sense. The following claims are intended to cover generic and specific features described herein, as well as all statements of the scope of the present method and system.

What is claimed is:

1. A computing system of the type comprising at least one processor (CPU) coupled through at least one front-end storage controller (nFE_SAN) to a first and second storage-area network (SAN), the first and second SAN coupled through at least one back-end storage controller (nBE_SAN) to a plurality of storage devices, the improvement comprising:

a first nFE_SAN of the at least one nFE_SAN having a first and a second write-back cache module configured to, upon receiving a write command addressed to a data block, to receive write data from the at least one CPU, maintain a first copy of the write data in the first write-back cache module and a second copy of the write data in the second write-back cache module of data written by the at least one processor to the storage devices until the data is written to the at least one nBE_SAN, the first write-back cache module configured to receive power from a first power supply and the second write-back cache module configured to receive power from a second power supply;

the first nFE_SAN coupled to the at least one nBE_SAN through a first SAN and through a second SAN, the first SAN independent of the second SAN;

the nFE_SAN configured to be capable of transmitting data from the first write-back cache module to the at least one nBE_SAN over the first SAN when the first power supply is operational, and capable of transmitting data from the second write-back cache module to the at least one nBE_SAN when the second power supply is operational and the first power supply not operational; and the nFE_SAN configured to provide a write command complete response to the at least one CPU upon receiving the write data into the first and second writeback cache.

2. The computing system of claim 1 wherein the nFE_SAN is configured to request a write data lock from the at least one nBE_SAN for the data block upon receiving the write command, and to provide the write command complete response to the at least one CPU upon receiving the write data into the first and second writeback cache and receiving a write data lock from the at least one nBE_SAN.

3. The computing system of claim 1 wherein the SAN comprises a first network and a second network, the nFE_SAN being configured to send data from the first writeback cache to the at least one nBE_SAN over the first network and from the second writeback cache to the at least one nBE_SAN over the second network.

4. The system of claim 1 wherein the nFE_SAN is coupled to the processor through an interconnect selected from the group consisting of PCI, PCIe, SBus, IBM Coherent Accelerator Processor Interface (CAPI), QuickPath Interconnect (QPI), HyperTransport (HT), and a memory channel interface.

5. A computing system of the type comprising at least one processor (CPU) coupled through at least one front-end storage controller (nFE_SAN) to a storage-area network (SAN), the SAN coupled through at least one back-end storage controller (nBE_SAN) to a plurality of storage devices, the improvement comprising:

a first nFE_SAN of the at least one nFE_SAN having a first and a second write-back cache module configured to, upon receiving a write command addressed to a data block, to receive write data from the at least one CPU, maintain a first copy of the write data in the first write-back cache module and a second copy of the write data in the second write-back cache module of data written by the at least one processor to the storage devices until the data is written to the at least one nBE_SAN, the first write-back cache module configured to receive power from a first power supply and the second write-back cache module configured to receive power from a second power supply;

the first nFE_SAN coupled to the at least one nBE_SAN through a first SAN and through a second SAN;

the nFE_SAN configured to be capable of transmitting data from the first write-back cache module to the at least one nBE_SAN over the first SAN when the first power supply is operational, and capable of transmitting data from the second write-back cache module to the at least one nBE_SAN when the second power supply is operational and the first power supply not operational; and the nFE_SAN configured to provide a write command complete response to the at least one CPU upon receiving the write data into the first and second writeback cache;

wherein a first nBE_SAN of the at least one nBE_SAN comprises a third and a fourth writeback cache, the first nBE_SAN being configured, upon receiving the write data from the nFE_SAN, to maintain a copy of the write data in both the third and the fourth writeback cache until the write data is written to at least one storage device of the plurality of storage devices.

6. The computing system of claim 5 wherein the nFE_SAN is configured to request a write data lock from the at least one nBE_SAN for the data block upon receiving the write command, and to provide the write command complete response to the at least one CPU upon receiving the write data into the first and second writeback cache and receiving a write data lock from the at least one nBE_SAN.

7. The computing system of claim 6 wherein the SAN comprises a first network and a second network, the nFE_SAN being configured to send data from the first writeback cache to the at least one nBE_SAN over the first network and from the second writeback cache to the at least one nBE_SAN over the second network.

8. The computing system of claim 7 wherein the second network and first network are of different types.

9. The computing system of claim 7 wherein the nFE_SAN further comprises a firmware selected from the group consisting of data compression firmware and data encryption firmware.

10. The computing system of claim 9 wherein the nFE_SAN further comprises a distributed resource manager adapted to recognize write data addresses associated with a first and a second nBE_SAN, and of routing communications to the nBE_SAN associated with the write data address.

11. The computing system of claim 7 wherein the nFE_SAN further comprises a firmware selected from the group consisting of de-duplication firmware and thin-provisioning firmware.

12. A method of writing write data to at least one storage device comprising:

generating a write request in a computer processor;

passing the write request to a front-end storage controller (nFE_SAN);

copying the write data to a first and a second cache memory of the nFE_SAN;

generating a write lock request and transmitting the write lock request from the nFE_SAN over a network interconnect selected from a first and a second storage area interconnect to a back-end storage controller (nBE_SAN);

returning a write lock grant from the nBE_SAN to the nFE_SAN;

upon completing copying the write data to the first and second cache memory of the nFE_SAN and receiving the write lock grant from the nBE_SAN, the nFE_SAN providing a write complete signal to the computer processor;

copying the write data over a network interconnect selected from the first and second storage area interconnect to the nBE_SAN;

writing, by the nBE_SAN, the write data to the at least one storage device; and writing the write data into a third and a fourth cache memory disposed within the nBE_SAN.

13. The method of claim 12 wherein, upon failure of the first cache memory of the nFE_SAN, the write data is copied from the second cache memory of the nFE_SAN to the nBE_SAN.

* * * * *